(12) United States Patent
Cho et al.

(10) Patent No.: US 12,004,309 B2
(45) Date of Patent: Jun. 4, 2024

(54) FOLDABLE ELECTRONIC DEVICE INCLUDING PLURALITY OF WINDOWS

(71) Applicant: Samsung Electronics Co., Ltd., Suwon-si (KR)

(72) Inventors: Joungmin Cho, Suwon-si (KR); Harksang Kim, Suwon-si (KR); Jiyong Kim, Suwon-si (KR); Jungchul An, Suwon-si (KR); Sungjun Lee, Suwon-si (KR); Kwangtai Kim, Suwon-si (KR); Donghyun Yeom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 312 days.

(21) Appl. No.: 17/426,821

(22) PCT Filed: Feb. 18, 2020

(86) PCT No.: PCT/KR2020/002344
§ 371 (c)(1),
(2) Date: Jul. 29, 2021

(87) PCT Pub. No.: WO2020/171562
PCT Pub. Date: Aug. 27, 2020

(65) Prior Publication Data
US 2022/0141969 A1    May 5, 2022

(30) Foreign Application Priority Data
Feb. 19, 2019   (KR) .................. 10-2019-0019545

(51) Int. Cl.
*H05K 5/00* (2006.01)
*H04M 1/02* (2006.01)

(52) U.S. Cl.
CPC ........ *H05K 5/0017* (2013.01); *H04M 1/0268* (2013.01)

(58) Field of Classification Search
CPC .................................................. H04M 1/0268
See application file for complete search history.

(56) References Cited

U.S. PATENT DOCUMENTS 10,111,346 B2   10/2018   Seo et al.
10,318,129 B2    6/2019   Inagaki et al.
(Continued)

FOREIGN PATENT DOCUMENTS

AU    2018200472 B2   10/2019
CN       1672119 A     9/2005
(Continued)

OTHER PUBLICATIONS

English Translation CN 106910823 (Year: 2017).*
(Continued)

*Primary Examiner* — Mukundbhai G Patel
(74) *Attorney, Agent, or Firm* — Jefferson IP Law, LLP

(57) ABSTRACT

A foldable electronic device is provided. The electronic device includes a flexible display, a first window including a first surface facing the flexible display and a second surface facing the opposite direction to the first surface, the first surface adhered to at least partial region of the flexible display via a first adhesive, and a second window adhered to at least partial region of the second surface of the first window via a second adhesive, in which the first adhesive has a greater thickness than the second adhesive.

14 Claims, 16 Drawing Sheets

(56) References Cited

U.S. PATENT DOCUMENTS

| | | | |
|---|---|---|---|
| 10,446,062 | B2 | 10/2019 | Li et al. |
| 2004/0017362 | A1 | 1/2004 | Mulligan et al. |
| 2012/0242592 | A1 | 9/2012 | Rothkopf et al. |
| 2013/0141664 | A1 | 6/2013 | Toyoyama |
| 2014/0054438 | A1 | 2/2014 | Yun et al. |
| 2015/0043137 | A1 | 2/2015 | Lee |
| 2015/0070593 | A1 | 3/2015 | Shimizu |
| 2015/0241925 | A1 | 8/2015 | Seo et al. |
| 2016/0033711 | A1 | 2/2016 | Lee et al. |
| 2016/0066412 | A1 | 3/2016 | Choi et al. |
| 2016/0378246 | A1 | 12/2016 | Kim |
| 2017/0068275 | A1 | 3/2017 | Lee et al. |
| 2017/0092892 | A1 | 3/2017 | Zhang et al. |
| 2017/0153668 | A1 | 6/2017 | Jang et al. |
| 2017/0156227 | A1 | 6/2017 | Heo et al. |
| 2017/0162823 | A1 | 6/2017 | Kim et al. |
| 2017/0217143 | A1 | 8/2017 | Kim et al. |
| 2017/0278899 | A1* | 9/2017 | Yang ............ H10K 59/40 |
| 2017/0303423 | A1 | 10/2017 | Cavallaro et al. |
| 2017/0373121 | A1 | 12/2017 | Leng et al. |
| 2017/0373281 | A1 | 12/2017 | Park et al. |
| 2018/0077808 | A1 | 3/2018 | Seo et al. |
| 2018/0088392 | A1 | 3/2018 | Park et al. |
| 2018/0157090 | A1 | 6/2018 | Kim et al. |
| 2018/0190723 | A1 | 7/2018 | Han et al. |
| 2018/0192527 | A1 | 7/2018 | Yun et al. |
| 2018/0348821 | A1 | 12/2018 | Hamburgen et al. |
| 2018/0364759 | A1 | 12/2018 | Ahn et al. |
| 2019/0036068 | A1 | 1/2019 | Kim et al. |
| 2019/0196550 | A1 | 6/2019 | Kim et al. |
| 2019/0384111 | A1 | 12/2019 | Lee et al. |
| 2020/0044003 | A1 | 2/2020 | Cho et al. |
| 2020/0139671 | A1 | 5/2020 | Cao |

FOREIGN PATENT DOCUMENTS

| | | | | |
|---|---|---|---|---|
| CN | 202014286 | U | 10/2011 | |
| CN | 106910823 | * | 6/2017 | ............ G09F 9/33 |
| CN | 107031135 | A | 8/2017 | |
| CN | 107255655 | A | 10/2017 | |
| CN | 107293220 | A | 10/2017 | |
| CN | 108153014 | A | 6/2018 | |
| CN | 108475084 | A | 8/2018 | |
| CN | 207968615 | U | 10/2018 | |
| CN | 108819433 | A | 11/2018 | |
| EP | 3199339 | * | 8/2017 | ............ G06F 1/16 |
| EP | 3199339 | A1 | 8/2017 | |
| JP | 2013-083913 | A | 5/2013 | |
| JP | 2016-033650 | A | 3/2016 | |
| JP | 2017-100439 | A | 6/2017 | |
| KR | 10-2014-0027612 | A | 3/2014 | |
| KR | 20140027612 | * | 3/2014 | ....... G02F 1/133308 |
| KR | 10-2015-0017568 | A | 2/2015 | |
| KR | 101516766 | B1 | 5/2015 | |
| KR | 101574923 | B1 | 12/2015 | |
| KR | 10-2016-0150007 | A | 12/2016 | |
| KR | 10-2017-0064453 | A | 6/2017 | |
| KR | 10-2017-0066764 | A | 6/2017 | |
| KR | 10-2017-0090339 | A | 8/2017 | |
| KR | 10-2018-0002114 | A | 1/2018 | |
| KR | 10-2018-0030301 | A | 3/2018 | |
| KR | 10-1834793 | B1 | 3/2018 | |
| KR | 10-2018-0034056 | A | 4/2018 | |
| KR | 10-2018-0079016 | A | 7/2018 | |
| KR | 10-2018-0079025 | A | 7/2018 | |
| KR | 10-2018-0108271 | A | 10/2018 | |
| KR | 10-1911698 | B1 | 10/2018 | |
| KR | 10-2019-0001864 | A | 1/2019 | |
| KR | 10-2019-0003257 | A | 1/2019 | |
| RU | 2 645 665 | C2 | 2/2018 | |
| RU | 2 683 290 | C2 | 3/2019 | |
| WO | 2018/226829 | A1 | 12/2018 | |

OTHER PUBLICATIONS

English translation KR 20140027612 (Year: 2014).*
Russian Notice of Allowance dated Apr. 18, 2022, issued in Russian Patent Application No. 2021124431.
Extended European Search Report dated Jun. 6, 2023, issued in European Patent Application No. 23157201.7.
Chinese Office Action dated Nov. 17, 2021, issued in a counterpart Chinese Application No. 202080014987.6.
Extended European Search Report dated Feb. 7, 2022, issued in a counterpart European Application No. 20759255.1.
Indian Office Action dated Dec. 6, 2023, issued in Indian Application No. 202117034980.
Korean Office Action dated Dec. 21, 2023, issued in Korean Application No. 10-2019-0019545.
Japanese Notice of Allowance dated Feb. 5, 2024, issued in Japanese Application No. 2021-548155.

* cited by examiner

<601>

<602>

<603>

<701>

<702>

<703>

<704>

FOLDABLE ELECTRONIC DEVICE INCLUDING PLURALITY OF WINDOWS

CROSS-REFERENCE TO RELATED APPLICATION(S)

This application is a U.S. National Stage application under 35 U.S.C. § 371 of an International application number PCT/KR2020/002344, filed on Feb. 18, 2020, which is based on and claimed priority of a Korean patent application number 10-2019-0019545, filed on Feb. 19, 2019, in the Korean Intellectual Property Office, the disclosure of which is incorporated by reference herein in its entirety.

BACKGROUND

1. Field

The disclosure relates to a foldable electronic device including a plurality of windows.

2. Description of Related Art

Recently, portable electronic devices are rapidly spread due to the development of the electronic communication industry. For example, such portable electronic devices may include various electronic devices which can be freely used while moving without being limited to a place, such as personal digital assistants (PDA), a smartphone, a tablet PC, an MP3 player, a laptop personal computer (PC), a digital camera, and a wearable device, in addition to a mobile communication terminal for communication.

A form of the electronic device is changing into various forms depending on users' needs. For example, the electronic device may have a structure deformable in a way to be easily carried and to use a display having a large screen when used. For example, the electronic device may include an electronic device having a foldable form in which some areas (e.g., display area) can be folded or unfolded, if necessary.

The above information is presented as background information only to assist with an understanding of the disclosure. No determination has been made, and no assertion is made, as to whether any of the above might be applicable as prior art with regard to the disclosure.

SUMMARY

As an operation of folding and unfolding a flexible display of a foldable electronic device is repeated several times or more, a display panel is first damaged before life periods of other electronic parts are reached. Accordingly, the entire service life of the foldable electronic device may depend on the lifespan of the display panel.

A construction of a foldable electronic device capable of minimizing damage to a flexible display may be required because costs for replacing the flexible display may be much more expensive than costs for replacing the existing flat panel display.

Aspects of the disclosure are to address at least the above-mentioned problems and/or disadvantages and to provide at least the advantages described below. Accordingly, an aspect of the disclosure is to provide a foldable electronic device including a plurality of windows.

Another aspect of the disclosure is to provide a foldable electronic device including a window, which can prevent damage to an internal window and help to reduce costs by easily replacing a window adjacent to the outside among a plurality of windows.

Additional aspects will be set forth in part in the description which follows and, in part, will be apparent from the description, or may be learned by practice of the presented embodiments.

In accordance with an aspect of the disclosure, a foldable electronic device is provided. The foldable electronic device includes a flexible display, a first window including a first face toward the flexible display and a second face toward a direction opposite to the first face, the first face being attached to at least some areas of the flexible display through a first adhesive, and a second window attached to at least some areas of the second face of the first window through a second adhesive, wherein the first adhesive has a greater thickness than the second adhesive.

In accordance with another aspect of the disclosure, a foldable electronic device is provided. The foldable electronic device includes a hinge structure, a first housing structure connected to the hinge structure and configured to include a first face, a second face toward a direction opposite to the first face, and a first side housing surrounding at least part of a first space between the first face and the second face, a second housing structure connected to the hinge structure, configured to include a third face, a fourth face directed toward a direction opposite to the third face, and a second side housing surrounding at least part of a second space between the third face and the fourth face, and folded along with the first housing structure by using the hinge structure as an axis, a flexible display disposed in the first space of the first housing structure and the second space of the second housing structure and configured to have at least some portions thereof viewed through a first direction toward the first face and the third face, a first window attached to at least some areas of one face toward the first direction of the flexible display through a first adhesive, and a second window attached to at least some areas of one face toward the first direction of the first window through a second adhesive.

In accordance with another aspect of the disclosure, a method of detecting damage to a window of an electronic device is provided. The method includes an operation of determining, by a processor, a capacitance value for a plurality of patterns formed on the bottom of a window covering a display by using a touch circuit, and an operation of identifying, by the processor, whether the window has been damaged based on the determined capacitance value.

According to various embodiments, the foldable electronic device can minimize damage to the flexible display by including a plurality of window layers including the first window and the second window.

According to various embodiments, the foldable electronic device can prevent damage to the flexible display and the first window for protecting the flexible display by making small adhesive strength of the second adhesive for bonding the first window and the second window than adhesive strength of the first adhesive for bonding the first window and the flexible display and simply replacing the second window if damage (e.g., a crack) has been applied to the second window.

According to various embodiments, the foldable electronic device can prevent damage to the flexible display and the first window for protecting the flexible display by automatically identifying whether the second window has been damaged using the touch circuit and providing a user with notification of the replacement of the second window.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
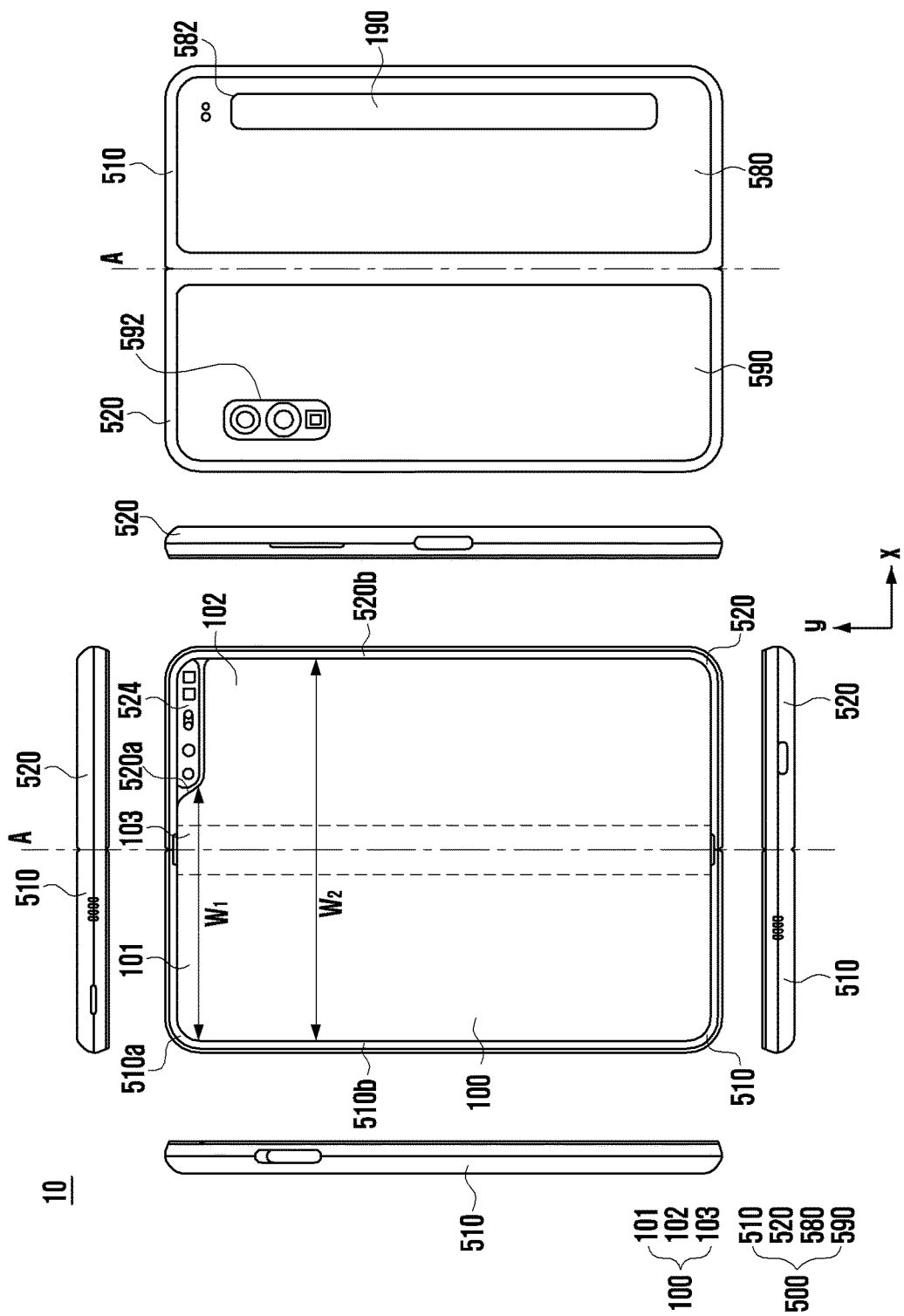
FIG. 1 is a diagram illustrating an unfolding state of an electronic device according to an embodiment of the disclosure.
Figure 2:
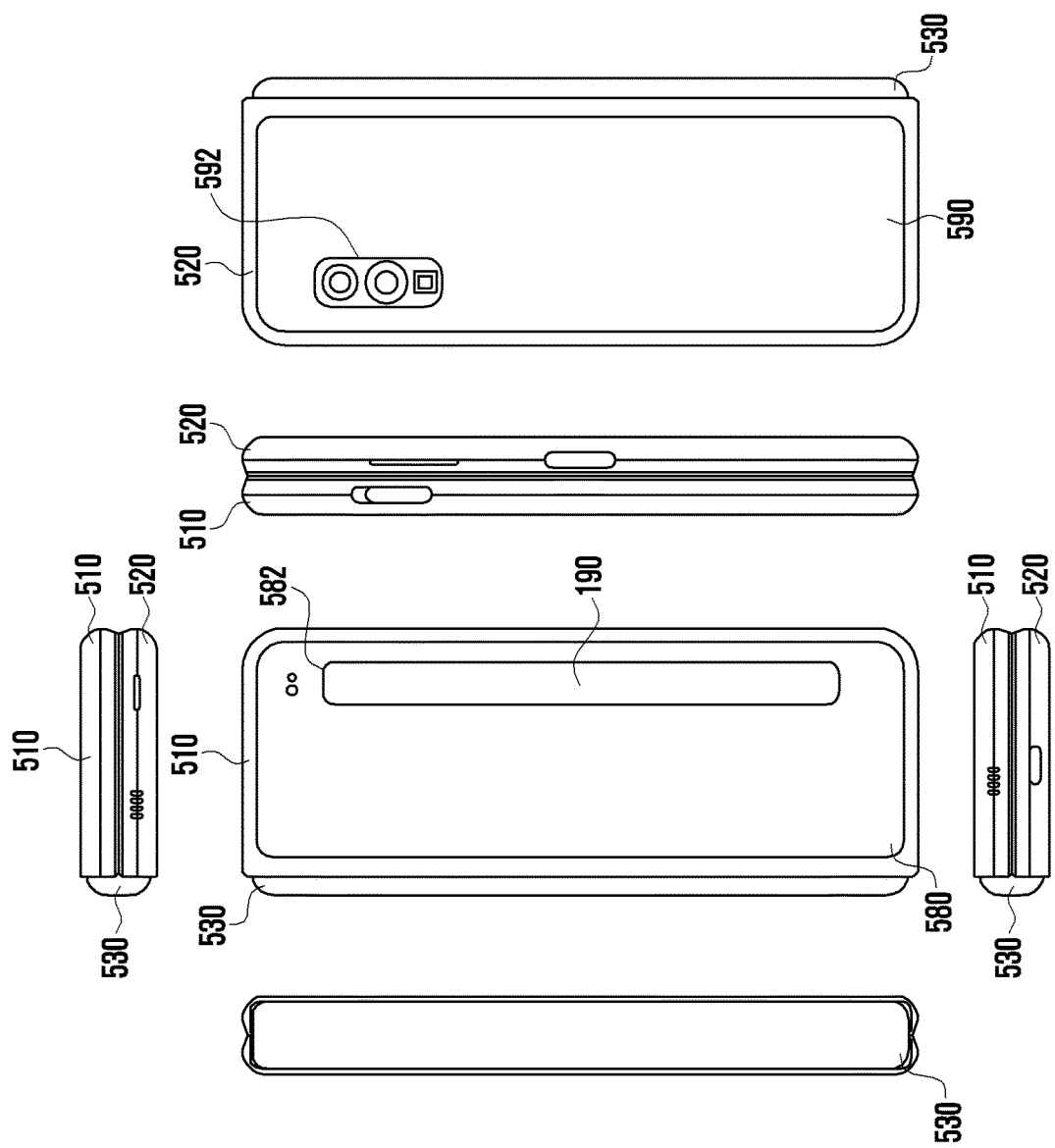
FIG. 2 is a diagram illustrating a folding state of the electronic device according to an embodiment of the disclosure.

Referring to FIGS. 1 and 2, in an embodiment, the electronic device 10 may include a foldable housing 500, a hinge cover 530 that covers a foldable portion of the foldable housing 500, and a flexible or foldable display 100 (which may hereinafter, be referred to as "display") disposed in a space defined by the foldable housing 500. In the disclosure, a surface on which the display 100 is disposed may, for example, be referred to as a first surface or a front surface of the electronic device 10. In addition, the opposite surface of the front surface may, for example, be referred to as a second surface or a rear surface of the electronic device 10. Also, a surface surrounding a space between the front and rear surfaces may, for example, be referred to as a third surface or a lateral surface of the electronic device 10.

FIG. 1 is a diagram illustrating an unfolding state of an electronic device according to an embodiment of the disclosure.

FIG. 2 is a diagram illustrating a folding state of the electronic device according to an embodiment of the disclosure.

In an embodiment, the foldable housing 500 may include a first housing structure (e.g., a first housing) 510, a second housing structure (e.g., a second housing) 520 having a sensor area 524, a first rear cover 580, and a second rear cover 590. The foldable housing 500 of the electronic device 10 is not limited to the shape and configuration shown in FIGS. 1 and 2, and may be implemented with any other shape and configuration. For example, and without limitation, in another embodiment, the first housing 510 and the first rear cover 580 may be integrally formed, and also the second housing 520 and the second rear cover 590 may be integrally formed.

In the illustrated embodiment, the first housing 510 and the second housing 520 are disposed at both sides with respect to a folding axis (indicated by 'A'), and may have a generally symmetric shape with respect to the folding axis (A). As will be described in greater detail below, the first and second housings 510 and 520 may have different angles or distances therebetween, depending on whether the electronic device 10 is in a flat (e.g., unfolded) state, a folded state, or an intermediate state. In the illustrated embodiment, the second housing 520 has the sensor area 524 in which various sensors are disposed. Excepting the provision of the sensor area 524, both housings may be substantially symmetrical in shape.

Referring to FIG. 1, the first housing 510 and the second housing 520 may together include a recess for accommodating the display 100 therein. In the illustrated embodiment, the recess may have two or more different widths in a direction perpendicular to the folding axis (A) because of the sensor area 524.

For example, the recess may have a first width ($W_1$) between a first portion 510a of the first housing 510 parallel to the folding axis (A) and a first portion 520a of the second housing 520 formed at one edge of the sensor area 524, and a second width ($W_2$) between a second portion 510b of the first housing 510 parallel to the folding axis (A) and a second portion 520b of the second housing 520 not corresponding to the sensor area 524 and being parallel to the folding axis (A). In this example, the second width ($W_2$) may be greater than the first width ($W_1$). In other words, the first portion 510a of the first housing 510 and the first portion 520a of the second housing 520, which have asymmetrical shapes, define the first width ($W_1$) of the recess, whereas the second portion 510b of the first housing 510 and the second portion 520b of the second housing 520, which have symmetrical shapes, define the second width ($W_2$) of the recess. In an embodiment, the first portion 520a and the second portion 520b of the second housing 520 may have different distances from the folding axis (A). The width of the recess is not limited to the illustrated example. In various embodiments, the recess may have a plurality of different widths depending on the shape of the sensor area 524 or asymmetrical shapes of the first and second housings 510 and 520.

In an embodiment, at least a portion of the first and second housings 510 and 520 may comprise a metallic or non-metallic material having a selected rigidity value to support the display 100.

In an embodiment, the sensor area 524 may occupy a certain region adjacent to one corner of the second housing 520. The arrangement, shape, and size of the sensor area 524 are not limited to the illustrated example. For example, in other embodiments, the sensor area 524 may be disposed at any other corner of the second housing 520 or at any position between top and bottom corners. In an embodiment, components for performing various functions may be embedded in the electronic device 10 and exposed to the front surface of the electronic device 10 through the sensor area 524 or through one or more openings provided in the sensor area 524. In various embodiments, such components may include various types of sensors, which may include, for example, and without limitation, at least one of a front camera, a receiver, a proximity sensor, or the like.

The first rear cover 580 is disposed on one side of the folding axis on the rear surface of the electronic device 10. The first rear cover 580 may have, for example, a substantially rectangular periphery surrounded by the first housing 510. Similarly, the second rear cover 590 is disposed on the other side of the folding axis on the rear surface of the electronic device 10, and a substantially rectangular periphery thereof may be surrounded by the second housing 520.

In the illustrated embodiment, the first rear cover 580 and the second rear cover 590 may have a substantially symmetrical shape with respect to the folding axis (A). This is, however, not essential. In another embodiment, the electronic device 10 may include the first and second rear covers 580 and 590 having various shapes. In still another embodiment, the first rear cover 580 may be integrally formed with the first housing 510, and the second rear cover 590 may be integrally formed with the second housing 520.

In an embodiment, the first rear cover 580, the second rear cover 590, the first housing 510, and the second housing 520 may together define a space in which various components of the electronic device 10 (e.g., a printed circuit board or a battery) are disposed. In an embodiment, one or more components may be disposed near and visually exposed to the rear surface of the electronic device 10. For example, at least a portion of a sub display 190 may be visually exposed through a first rear area 582 of the first rear cover 580. In another embodiment, one or more components or sensors may be visually exposed through a second rear area 592 of the second rear cover 590. In various embodiments, such sensors may include, for example, and without limitation, a proximity sensor and/or a rear camera, or the like.

Referring to FIG. 2, the hinge cover 530 is disposed between the first housing 510 and the second housing 520 and may be configured to cover an internal component (e.g., a hinge). In an embodiment, depending whether the electronic device 10 is in a flat state or in a folded state, the hinge cover 530 may be hidden by a part of the first and second housings 510 and 520 or exposed to the outside.

For example, when the electronic device 10 is in the flat state as shown in FIG. 1, the hinge cover 530 may be hidden by the first and second housings 510 and 520, thus being not exposed. Also, when the electronic device 10 is in the folded state (e.g., a fully folded state) as shown in FIG. 2, the hinge cover 530 may be exposed to the outside between the first and second housings 510 and 520. In the case of an intermediate state in which the first and second housings 510 and 520 are folded at a certain angle, the hinge cover 530 may be partially exposed to the outside between the first and second housings 510 and 520. The exposed area in the intermediate state may be smaller than that in the fully folded state. In an embodiment, the hinge cover 530 may have a curved surface.

The display 100 may be disposed in the space defined by the foldable housing 500. For example, the display 100 may be mounted in the recess formed by the foldable housing 500 while forming most of the front surface of the electronic device 10.

Therefore, the front surface of the electronic device 10 may include the display 100, a portion of the first housing 510 adjacent to the display 100, and a portion of the second housing 520. In addition, the rear surface of the electronic device 10 may include the first rear cover 580, a portion of the first housing 510 adjacent to the first rear cover 580, the second rear cover 590, and a portion of the second housing 520 adjacent to the second rear cover 590.

The display 100 may refer to a display that allows at least a portion thereof to be deformed into a curved surface. In an embodiment, as shown in FIG. 1, the display 100 may include a folding area 103, a first area 101 disposed on one side with respect to the folding area 103 (e.g., the left side of the folding area 103 shown in FIG. 1), and a second area 102 disposed on the other side with respect to the folding area 103 (e.g., the right side of the folding area 103 shown in FIG. 1).

The divided areas of the display 100 illustrated in FIG. 1 is an example only, and the display 100 may be divided into a plurality of areas (e.g., two, four or more) according to the structure or function thereof. For example, unlike being divided into areas based on the folding area 103 or the folding axis (A) each parallel to the y-axis in the illustrated FIG. 1 embodiment, the display 100 in another embodiment may be divided into areas based on another folding area or folding axis (e.g., each parallel to the x-axis).

The first area 101 and the second area 102 may have a symmetrical shape as a whole with respect to the folding area 103. However, unlike the first area 101, the second area 102 may have a cut portion to expose the sensor area 524, resulting in an asymmetrical shape. Therefore, the first and second areas 101 and 102 may have a symmetrical portion and an asymmetrical portion.

Hereinafter, in each particular state of the electronic device 10, the operations of the first and second housings 510 and 520 and the respective areas of the display 100 will be described.

In an embodiment, when the electronic device 10 is in a flat state (e.g., FIG. 1), the first housing 510 and the second housing 520 are disposed to form an angle of 180 degrees and face the same direction. Thus, the surfaces of the first and second areas 101 and 102 of the display 100 form an angle of 180 degrees with each other and face the same direction (e.g., the front direction of the electronic device). In addition, the folding area 103 may form the same plane as the first and second areas 101 and 102.

In an embodiment, when the electronic device 10 is in a folded state (e.g., FIG. 2), the first housing 510 and the second housing 520 are disposed to face each other. Thus, the surfaces of the first and second areas 101 and 102 of the display 100 form a small angle (e.g., between 0 and 10 degrees) and face each other. In addition, the folding area 103 may be formed to have partially a curved surface having a certain curvature.

In an embodiment, when the electronic device 10 is in an intermediate state, the first housing 510 and the second housing 520 are disposed to form a certain angle. Thus, the surfaces of the first and second areas 101 and 102 of the display 100 form a certain angle which is greater than the angle in the folded state and smaller than the angle in the flat state. In addition, the folding area 103 may be formed to have partially a curved surface having a certain curvature. This curvature is smaller than the curvature in the folded state.

Figure 3:
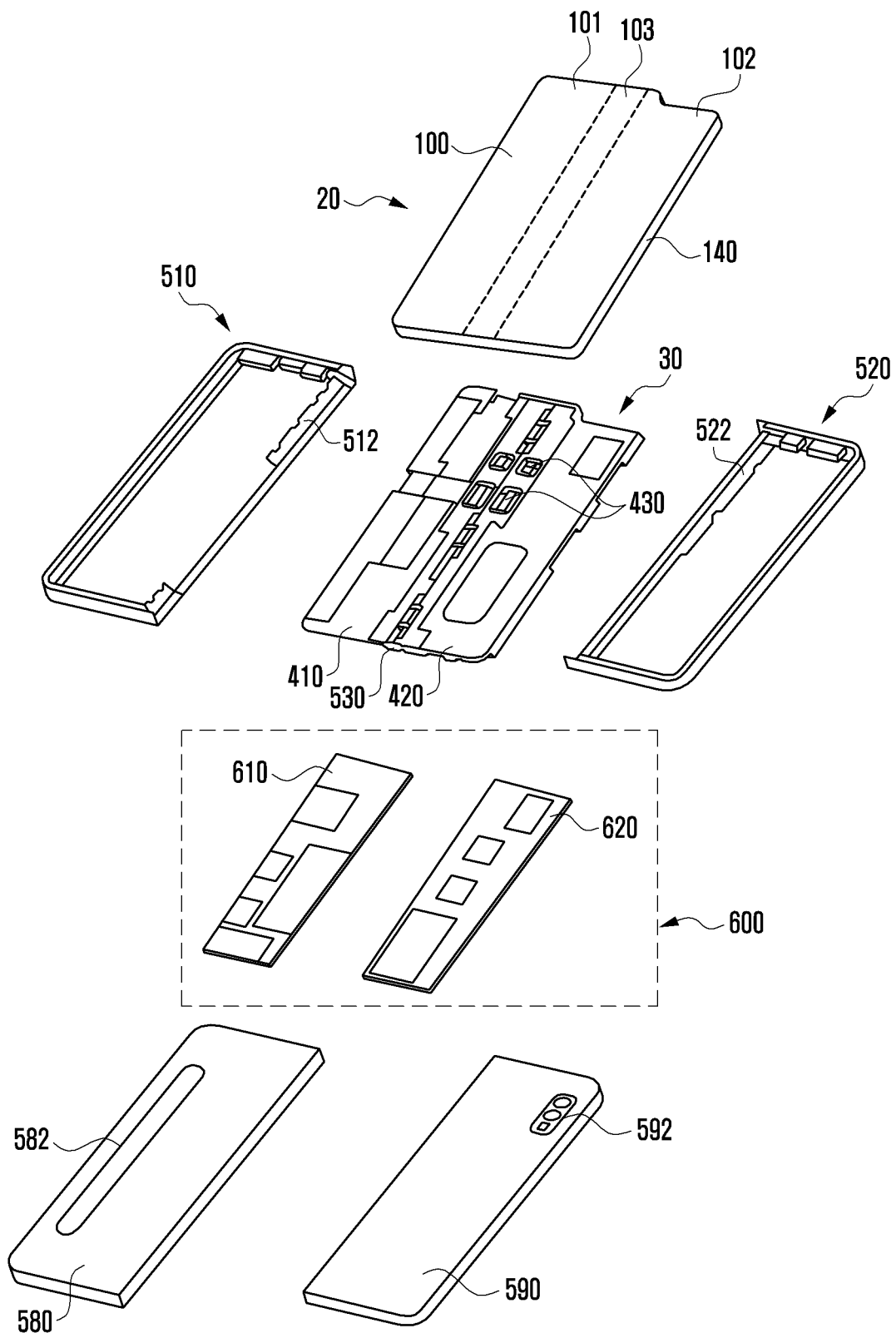
FIG. 3 is an exploded perspective view of an electronic device according to an embodiment of the disclosure.

FIG. 3 is an exploded perspective view illustrating an example foldable electronic device according to an embodiment of the disclosure.

Referring to FIG. 3, in an embodiment, the electronic device 10 may include a display unit (e.g., including a display) 20, a bracket assembly (e.g., including a bracket) 30, a substrate unit (e.g., including a substrate) 600, the first housing 510, the second housing 520, the first rear cover 580, and the second rear cover 590. In the disclosure, the display unit 20 may be also referred to as a display module or a display assembly.

The display unit 20 may include the display 100 and at least one plate or layer 140 on which the display 100 is mounted. In an embodiment, the plate 140 may be disposed between the display 100 and the bracket assembly 30. The display 100 may be disposed on at least a portion of one surface (e.g., the upper surface in FIG. 3) of the plate 140. The plate 140 may have a shape corresponding to the display 100. For example, a portion of the plate 140 may have a shape corresponding to a display area 104 of the display 100.

The bracket assembly 30 may include a first bracket 410, a second bracket 420, a hinge structure (e.g., including a hinge) disposed between the first and second brackets 410 and 420, the hinge cover 530 covering the hinge structure, and a wiring member 430 (e.g., a flexible printed circuit (FPC)) intersecting with the first and second brackets 410 and 420.

In an embodiment, the bracket assembly 30 may be disposed between the plate 140 and the substrate unit 600. For example, the first bracket 410 may be disposed between the first area 101 of the display 100 and a first substrate 610 of the substrate unit 600. The second bracket 420 may be disposed between the second area 102 of the display 100 and a second substrate 620 of the substrate unit 600.

In an embodiment, the wiring member 430 and the hinge structure may be disposed, at least in part, inside the bracket assembly 30. The wiring member 430 may be disposed in a direction (e.g., the x-axis direction) that crosses the first and second brackets 410 and 420. The wiring member 430 may be disposed in a direction perpendicular to a folding axis (e.g., the y-axis or the folding axis (A) in FIG. 1) of the folding area 103 of the electronic device 10.

As mentioned above, the substrate unit 600 may include the first substrate 610 disposed to correspond to the first bracket 410, and the second substrate 620 disposed to correspond to the second bracket 420. The first and second substrates 610 and 620 may be disposed in a space formed by all or substantially all of the bracket assembly 30, the first housing 510, the second housing 520, the first rear cover 580, and the second rear cover 590. On the first substrate 610 and the second substrate 620, electronic components for implementing various functions of the electronic device 10 may be mounted.

The first housing 510 and the second housing 520 may be assembled to be combined with both sides of the bracket assembly 30 in a state where the display unit 20 is combined with the bracket assembly 30. As will be described below, the first housing 510 and the second housing 520 may be combined with the bracket assembly 30 by sliding on both sides of the bracket assembly 30.

In an embodiment, the first housing 510 may have a first rotation supporting surface 512, and the second housing 520 may have a second rotation supporting surface 522 corresponding to the first rotation supporting surface 512. Each of the first and second rotation supporting surfaces 512 and 522 may have a curved surface corresponding to the curved surface included in the hinge cover 530.

In an embodiment, when the electronic device 10 is in the flat state (e.g., FIG. 1), the first and second rotation supporting surfaces 512 and 522 cover the hinge cover 530 so that the hinge cover 530 may not be exposed or be exposed in a relatively small amount to the rear surface of the electronic device 10. Meanwhile, when the electronic device 10 is in the folded state (e.g., FIG. 2), the first and second rotation supporting surfaces 512 and 522 rotate along the curved surfaces included in the hinge cover 530 so that the hinge cover 530 may be exposed to the rear surface of the electronic device 10.

Figure 4A:
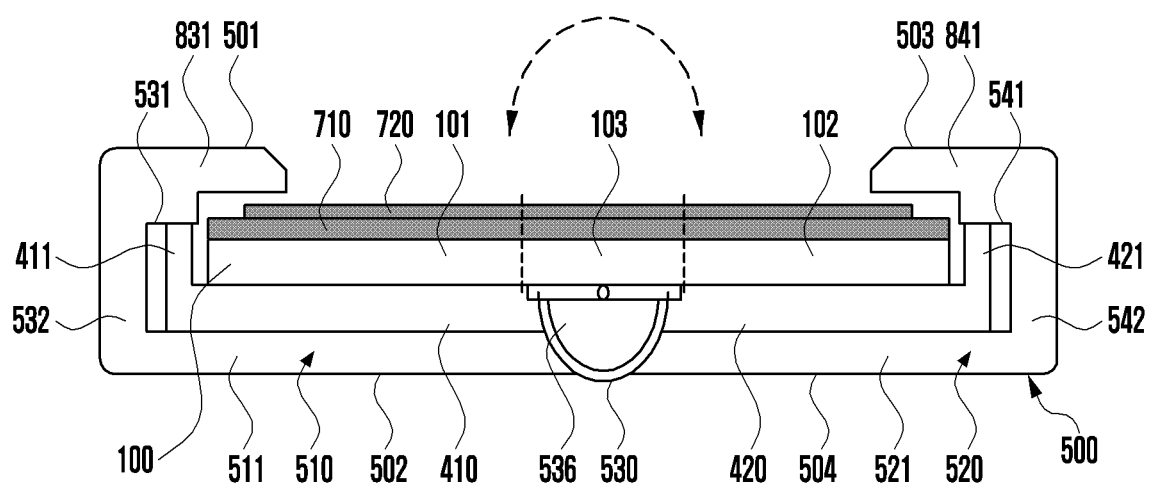
FIG. 4A is a cutaway cross-sectional view of an electronic device 10 according to an embodiment of the disclosure.

FIG. 4A is a cutaway cross-sectional view of an electronic device 10 according to an embodiment of the disclosure. Referring to FIG. 4A, it is a cross-sectional view when the electronic device 10 of FIG. 1 or 3 is cut away in an x-axis direction.

According to various embodiments, the electronic device 10 may include a foldable housing 500 and a display 100 (e.g., a flexible display). The foldable housing 500 may include a first housing structure 510 and a second housing structure 520 which may be rotated by a rotatable hinge structure 536.

According to various embodiments, the first housing structure 510 may surround a space formed by a first face 501 toward a first direction and a second face 502 toward a second direction opposite to the first direction. The first housing structure 510 may include a first rear plate 511 that forms the second face 502. A first side member 532 elongated in the first direction from the first rear plate 511 may surround a part of one space between the first face 501 and the second face 502. An electronic part that constitutes the electronic device 10 may be disposed in one space formed between the first face 501 and the second face 502. For example, a part of the display 100, a printed circuit board (not illustrated), or a first bracket 410 may be disposed in a space formed in the first housing structure 510.

For example, the first side member 532 may be elongated along a side 411 of the first bracket 410. The first side member 532 may be bent and elongated to form a face 531 that comes into contact with the end of the side 411 of the first bracket 410. The first side member 532 may include a first bezel 831 elongated from the face 531 that comes into contact with the end of the side 411 of the first bracket 410 to a direction in which at least some areas of the display 100 may be covered. In an embodiment, the first bezel 831 may be individually constructed in a way to be structurally coupled to the first side member 532.

According to various embodiments, the second housing structure 520 may surround a space formed by a third face 503 toward a third direction and a fourth face 504 toward a fourth direction opposite to the fourth direction. The second housing structure 520 may include a second rear plate 521 that forms the fourth face 504. A second side member 542 elongated from the second rear plate 521 to the third direction may surround a part of one space between the third face 503 and the fourth face 504. An electronic part that constructs the electronic device 10 may be disposed in a space (e.g., a first space) formed by the first housing structure 510 and a space (second space) formed by the second housing structure 520. For example, the display 100 or the printed circuit board (not illustrated) may be disposed in the spaces formed by the first housing structure 510 and the second housing structure 520. For example, a second bracket 420 may be disposed in the space formed by the second housing structure 520.

For example, the second side member 542 may be elongated along a side 421 of the second bracket 420. The second side member 542 may be bent and elongated to form a face 541 that comes into contact with the end of the side 421 of the second bracket 420. The second side member 542 may include a second bezel 841 elongated in a direction in which at least some areas of the display 100 may be covered. In an embodiment, the second bezel 841 may be individually constructed in a way to be structurally coupled to the second side member 542.

According to an embodiment, the first bracket 410 may be disposed on the first rear plate 511. According to an embodiment, the end of the side 411 of the first bracket 410 may come into contact with the first side member 532 of the first housing structure 510, and may be fixed by the first rear plate 511. The first bracket 410 may be coupled to the first rear plate 511 and moved along with the first rear plate 511. For example, the first bracket 410 may be coupled to the hinge structure 536 and may be at least partially rotated by the hinge structure 536. The first rear plate 511 may be rotated along with the first bracket 410.

For example, the second bracket 420 may be disposed on the second rear plate 521. The end of the side 421 of the second bracket 420 may come into contact with the second side member 542 of the second housing structure 520, and may be fixed by the second rear plate 521. The second bracket 420 may be coupled to the second rear plate 521 and moved along with the second rear plate 521. The second bracket 420 may be coupled to the hinge structure 536 and may be at least partially rotated by the hinge structure 536. The second rear plate 521 may be rotated along with the second bracket 420.

According to various embodiments, the display 100 may be disposed over the first bracket 410 and the second bracket 420. For example, a first area 101 of the display 100 may be supported by the first bracket 410, and a second area 102 of the display 100 may be supported by the second bracket 420. A folding area 103 of the display 100 may be disposed at a location corresponding to the hinge structure 536 or the hinge cover 530.

According to various embodiments, the electronic device 10 may include a first window 710 and a second window 720 which are disposed over the display 100 and cover at least some areas of the display 100. For example, the first window 710 may include a first face toward the display 100 and a second face toward a direction opposite to the first face. For example, the first face of the first window 710 may be attached to at least some areas of the display 100. For example, the second window 720 may be attached to at least some areas of the second face of the first window 710. For example, the first window 710 and the second window 720 may be made of a substantially transparent material, so that a screen of the display 100 may be viewed from the outside.

According to an embodiment, when a state of the electronic device 10 becomes a folding state by the hinge structure 536, the first housing structure 510 and the second housing structure 520 may be disposed to face each other. For example, the first face 501 of the foldable housing 500 may be rotated by the hinge structure 536, and may face the third face 503 (e.g., an in-folding method).

According to another embodiment, when a state of the electronic device 10 becomes the folding state, the second face 502 of the foldable housing 500 may be rotated to face the fourth face 504 (out-folding method). For example, when a state of the electronic device 10 is the folding state, the first area 101 and second area 102 of the display 100 may be viewed from the outside.

In an embodiment of the disclosure, constructions of the hinge structure 536 and the hinge cover 530 are not limited to those illustrated in FIG. 4A. For example, in an embodiment of the disclosure, the hinge structure 536 may not be an essential element, and various numbers of the hinge structures 536 may be disposed at various locations. For example, the hinge structure 536 may be disposed in the middle of the display 100 so that the plane of the display 100 is symmetrically folded as illustrated in FIG. 4A, but the disclosure is not limited thereto.

Figure 4B:
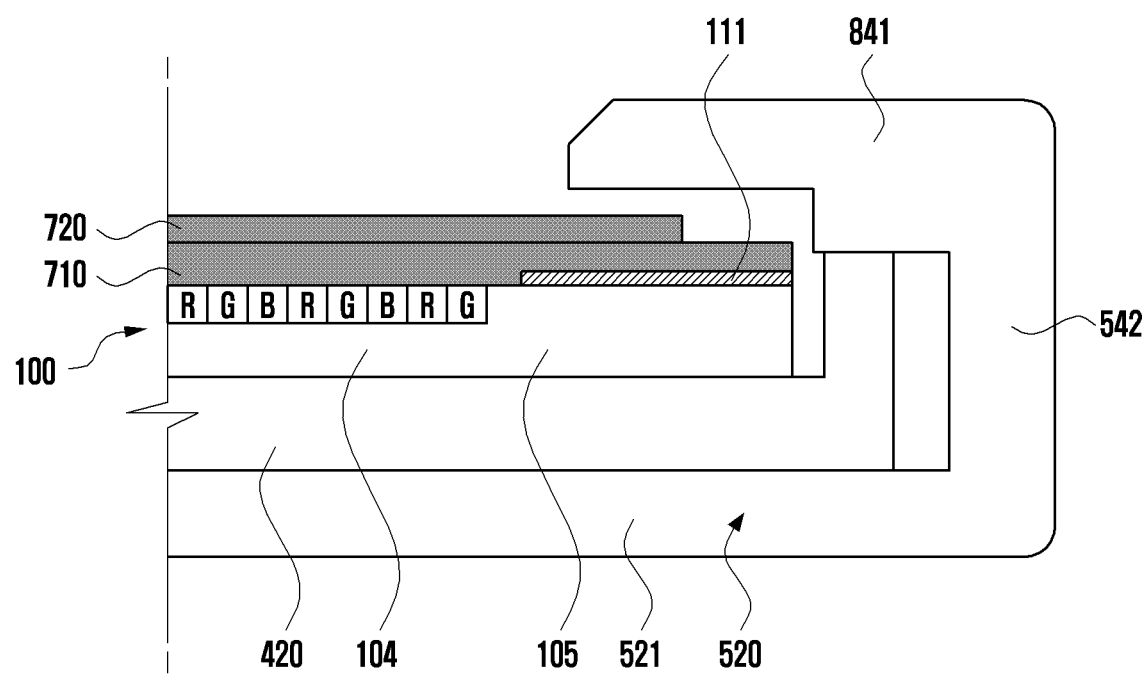
FIG. 4B is a cross-sectional view of an electronic device according to an embodiment of the disclosure.

FIG. 4B is a cross-sectional view of an electronic device according to an embodiment of the disclosure. According to various embodiments, the display 100 may include a display area 104 including a plurality of pixels and a non-display area 105, that is, an area other than the display area 104. For example, the display area 104 may mean an area (e.g., an active area) in which image data may be displayed to the outside.

According to various embodiments, the first window 710 may be disposed to cover at least some areas of the display 100 over the display 100. For example, the first face of the first window 710 toward the display 100 may be attached to at least some portions of the display 100. For example, the first window 710 may include an opaque area (e.g., a black matrix (BM) printed area) 111 for shielding at least some portions of the non-display area 105 of the display 100 from the outside in some areas of the first face. Furthermore, for example, the electronic device 10 may include a second opaque area formed on the display 100 instead of including the opaque area 111 in the first window 710 (or along with the opaque area 111 of the first window 710).

According to various embodiments, the second window 720 may be disposed to cover at least some areas of the second face, that is, a direction opposite to the first face of the first window 710. For example, the second window 720 may be attached to at least some portions of the second face of the first window 710.

According to various embodiments, the display 100 may be supported by a bracket assembly (e.g., a second bracket 420) disposed in a space formed by a foldable housing (e.g., the second rear plate 521 of the second housing structure 520, the second side member 542, and the second bezel 841).

Referring to FIG. 4B, when the display 100 is viewed from the top, the second window 720 may be disposed to overlap the display area 104 of the display 100 and at least some portions of the non-display area 105 (e.g., some areas of the opaque area 111 of the non-display area 105). Accordingly, at least some areas of the second window 720 may be shielded from the outside by a bezel (e.g., the second bezel 841) of a bracket assembly (e.g., the second bracket 420). For example, an edge of the second window 720 may be shielded by the second bezel 841 and covered in a way to be not viewed from the outside. Likewise, an edge of the second window 720 may be covered by a first bezel (e.g., the first bezel 831 in FIG. 4A) in a way to be not viewed from the outside.

Figure 4C:
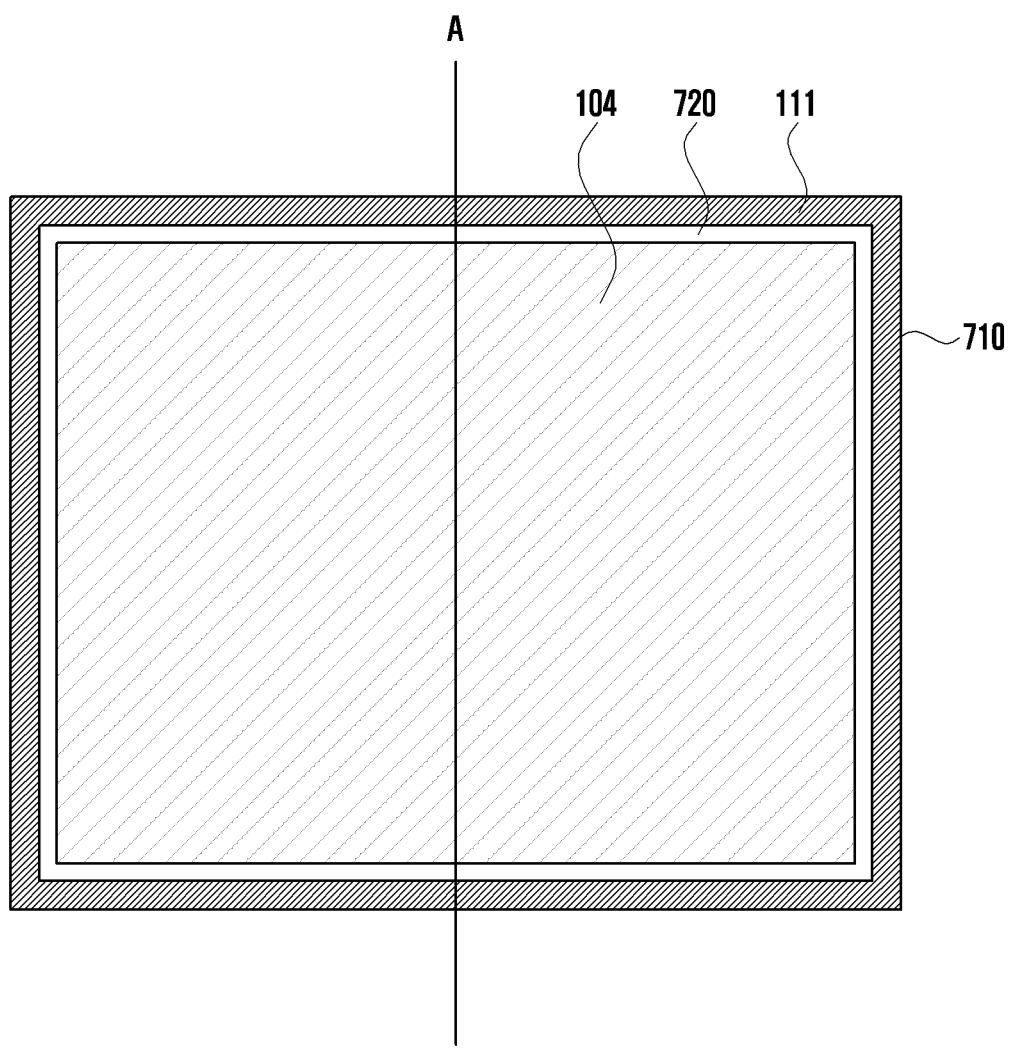
FIG. 4C is a diagram for describing a location of a second window 720 in the electronic device according to an embodiment of the disclosure.

FIG. 4C is a diagram for describing a location of the second window 720 in the electronic device according to an embodiment of the disclosure. Referring to FIG. 4C, it is a plan view when the display 100 to which the first window 710 and the second window 720 have been bonded in FIG. 4B is viewed from the top.

For example, the display 100 may include the display area 104 from which image data may be output and a non-display area (e.g., the non-display area 105 in FIG. 4B), that is, an area other than the display area. For example, the first window 710 covering the display 100 from the top may include the opaque area 111 that shields at least some areas of the non-display area.

For example, the second window 720 may cover the first window 710 from the top. For example, the second window 720 may cover the display area 104 of the display 100 and at least some areas of a non-display area (e.g., the non-display area 105 in FIG. 4B). For example, an area of the second window 720 may include at least some portions of an area of the first window 710. For example, an area of the first window 710 in which the second window 720 is not disposed may include some portions of a non-display area (e.g., some portions of the opaque area 111) in the outskirts of the display 100.

Figure 4D:
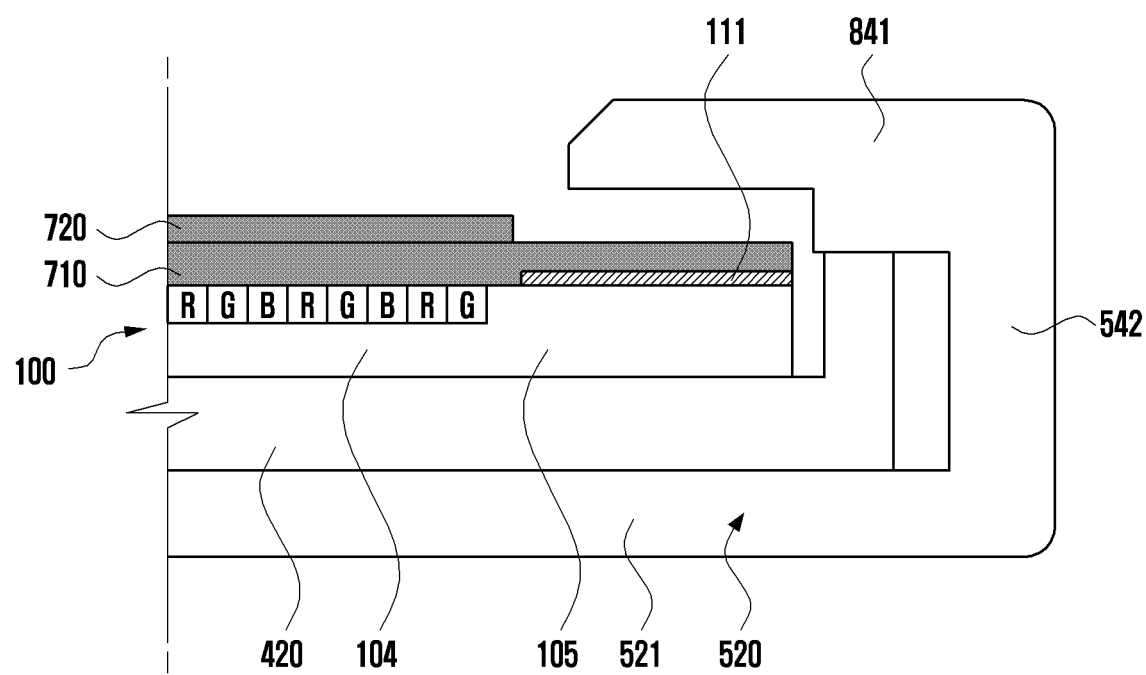
FIGS. 4D and 4E are cross-sectional views of an electronic device according to various embodiments of the disclosure.
Figure 4E:
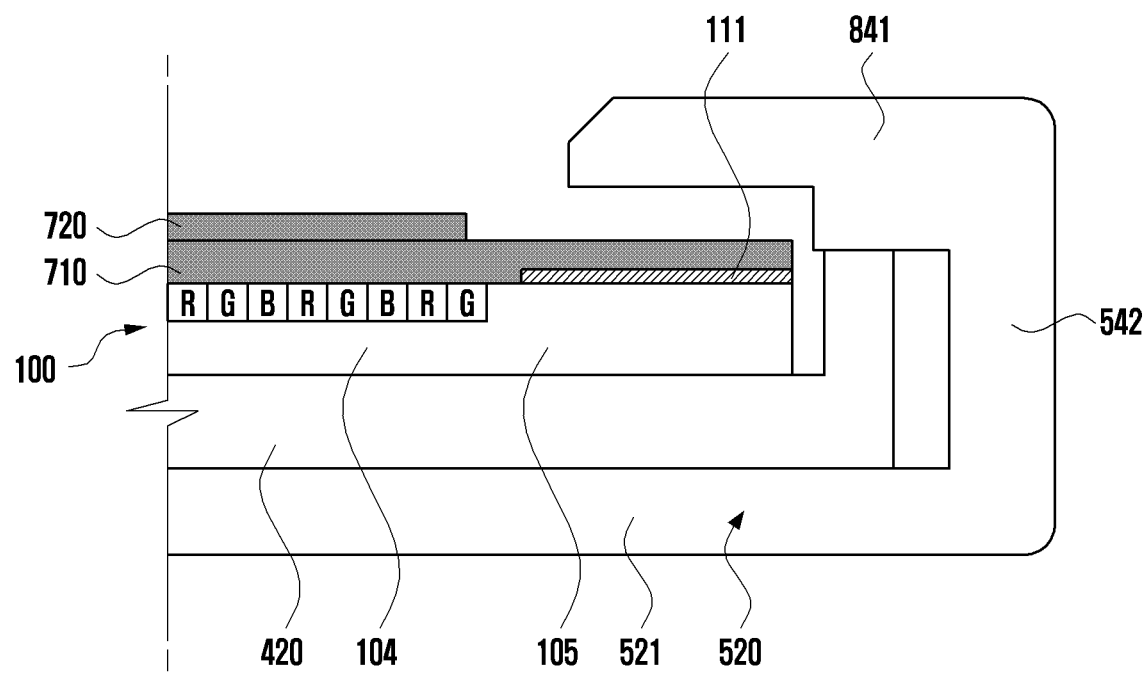

FIGS. 4D and 4E are cross-sectional views of an electronic device according to various embodiments of the disclosure.

Referring to FIG. 4D, unlike the second window 720 illustrated in FIG. 4B, a second window 720 according to an embodiment may be disposed in a way to be not shielded from the outside by a bezel (e.g., the second bezel 841).

For example, the second window 720 according to an embodiment may cover the display area 104 of the display 100 and at least some areas of the non-display area 105. For example, the second window 720 may not cover the opaque area 111 formed in the first face that faces the display 100 of the first window.

Referring to FIG. 4E, unlike the second windows 720 illustrated in FIGS. 4B and 4D, a second window 720 according to yet another embodiment may not cover the non-display area 105 of the display 100.

For example, the second window 720 may be disposed in a way to be not covered by a bezel (e.g., the second bezel 841). For example, the second window 720 may cover some areas of the display area 104 of the display 100, and may not cover the non-display area 105. According to various embodiments of the disclosure, the second window 720 of the electronic device 10 may be replaced with another second window 720 separately from the first window 710 and the display 100. For example, in the electronic device 10, if the second window 720 is not replaced with a new second window 720, as illustrated in FIG. 4B or 4D, the second window 720 may be disposed in an area capable of covering some areas of the display area 104 and non-display area 105 of the display 100.

For example, in the electronic device 10, if the already-attached second window 720 is removed and replaced with a new second window 720, the second window 720 may be disposed in an area capable of covering some areas of the display area 104 of the display 100.

In an embodiment, in the electronic device 10, if an already-attached second window 720 is removed and replaced with a new second window 720, the second window 720 may be disposed in an area which includes the display area 104 of the display 100 and may cover at least some areas of the non-display area 105. For example, the replaced second window 720 may be disposed in an area capable of covering the display area 104 and/or at least some areas of non-display area 105 of the display 100, which are included in an area not covered by a bezel (e.g., the second bezel 841).

FIGS. 4B, 4C, 4D and 4E illustrate arrangement relations in the display 100 through the second housing structure 520. However, arrangement relations in the display 100 through the first housing structure 510 may also be substantially identical with the arrangement relations illustrated in FIGS. 4B, 4C, 4D and 4E.

Figure 5A:
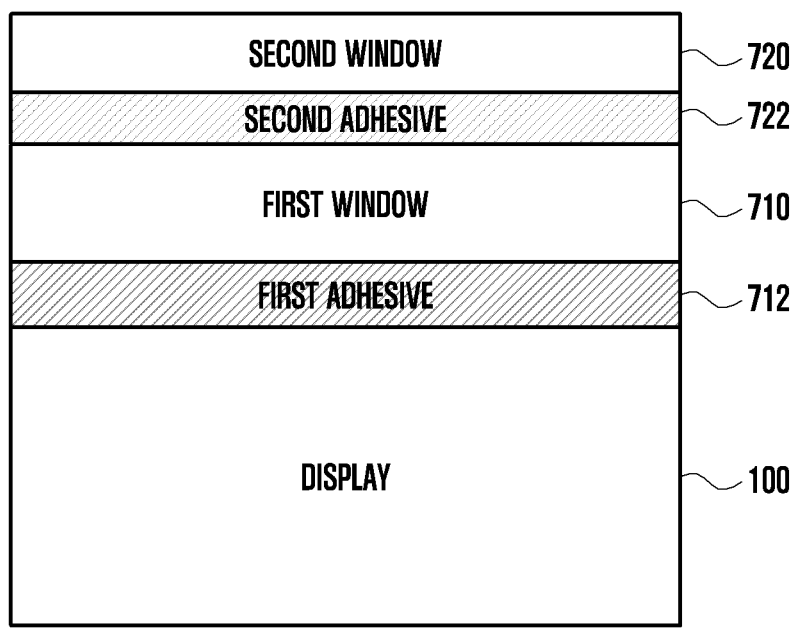
FIG. 5A is a diagram illustrating a stack structure of a display 100, a first window 710, and a second window 720 according to an embodiment of the disclosure.

FIG. 5A is a diagram illustrating a stack structure of the display 100, the first window 710, and the second window 720 according to an embodiment of the disclosure.

According to various embodiments, the first window 710 may include a first face toward the display 100 and a second face toward a direction opposite to the first face.

Referring to FIG. 5A, the first face of the first window 710 according to various embodiments may be attached to the display 100 (e.g., at least some areas of the display 100) through a first adhesive 712. For example, one face of the second window 720 may be attached to the second face of the first window 710 (e.g., at least some areas of the second face) through a second adhesive.

For example, adhesive strength of the first adhesive 712 may be greater than adhesive strength of a second adhesive 722. For example, a thickness of a portion coated with the first adhesive 712 may be greater than a thickness of a portion coated with the second adhesive 722. For example, the second window 720 may be detached from the first window 710 without damaging the first window 710 and the display 100 in the state in which the first window 710 and the display 100 have been bonded. In an embodiment, if the first adhesive 712 and the second adhesive 722 have the same adhesive strength, a thickness of the first adhesive 712 may be greater than a thickness of the second adhesive 722 so that the first adhesive 712 and the second adhesive 722 are configured to have different adhesive strength.

For example, the first window 710, the second window 720, the first adhesive 712, and the second adhesive 722 may be made of a substantially transparent material, and may transmit, to the outside, light output by the display 100. For example, the first window 710 and the second window 720 may be made of a polymer material. For example, the first window 710 and the second window 720 may be formed through at least one combination of polyimide (PI), polyethylene terephthalate (PET), polyurethane (PU), or cellulose triacetate (TAC). For example, the first window 710 may consist of a plurality of polymer layers. The second window 720 may consist of a single polymer layer.

Figure 5B:
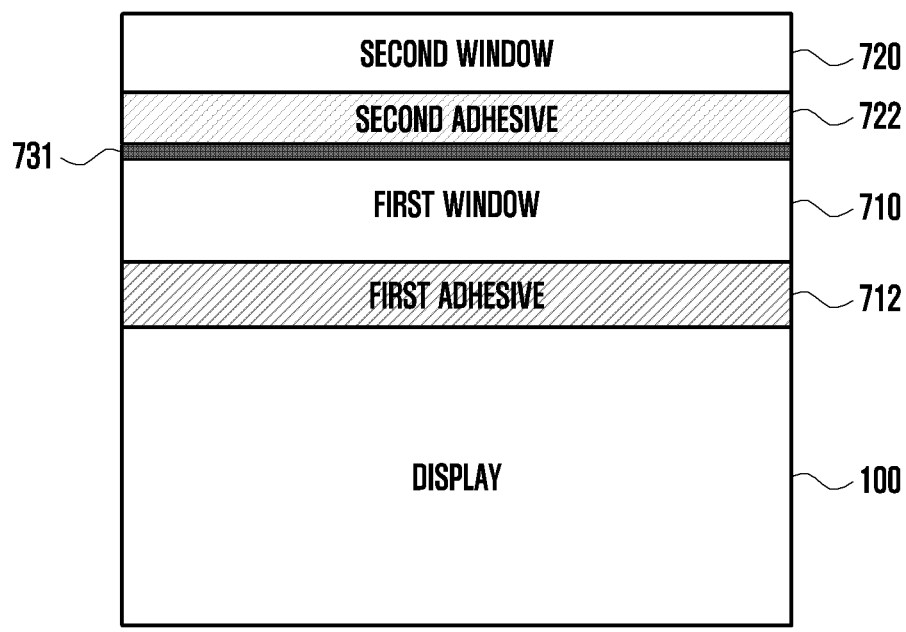
FIGS. 5B, 5C, and 5D are diagrams illustrating stack structures of the display 100, the first window 710, and the second window 720 according to various embodiments of the disclosure.
Figure 5C:
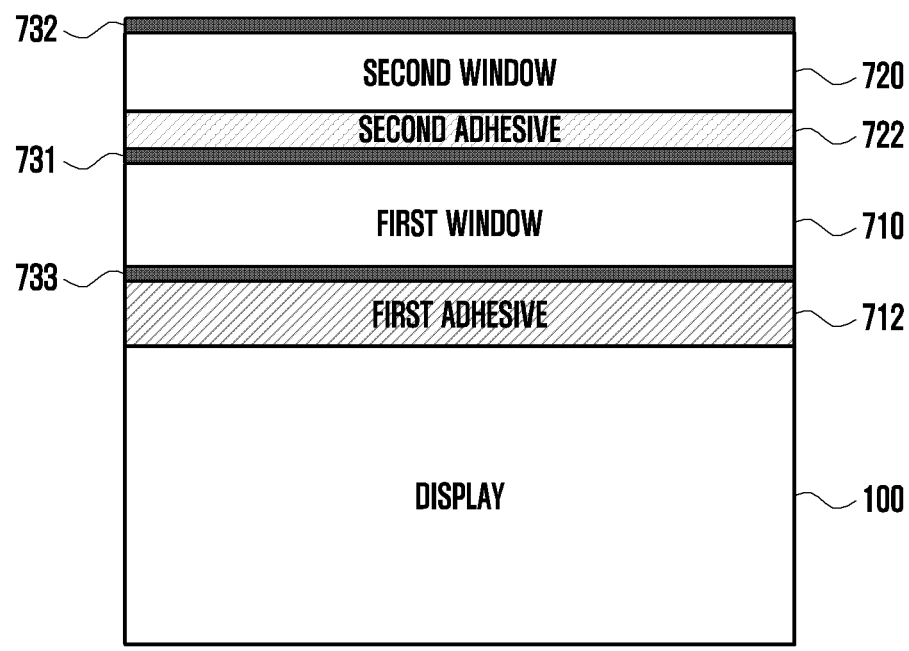
Figure 5D:
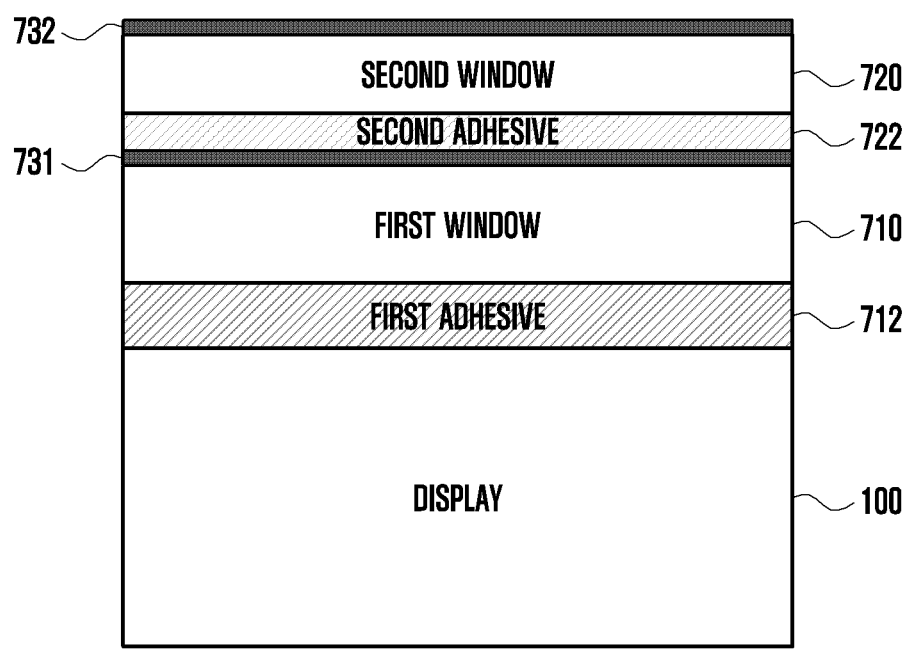

FIGS. 5B to 5D are diagrams illustrating stack structures of the display 100, the first window 710, and the second window 720 according to various embodiments of the disclosure.

Referring to FIG. 5B, the electronic device 10 may further include a first coating layer 731 on the top of the first window 710 (e.g., a face toward the second window 720 from the first window 710). For example, the second window 720 may be attached to the first coating layer 731, coated on the top of the first window 710, through the second adhesive 722.

For example, the first coating layer 731 may include at least one of an anti-fingerprint layer (AF layer, anti-fouling layer), a hard coating layer (HC layer), an anti-reflection layer (AR layer) (LR layer or low reflection layer) or an anti-glare layer (AG layer).

Referring to FIG. 5C, the electronic device 10 includes the first coating layer 731 on the top of the first window 710 (e.g., the face toward the second window 720 from the first window 710), and may include a second coating layer 732 on the top of the second window 720 (e.g., a face toward a direction opposite to a direction toward the first window 710 from the second window 720). Unlike the electronic device 10 illustrated in FIG. 5C, the electronic device 10 according to yet another embodiment may not include the first coating layer 731, and may include only the second coating layer 732.

For example, the first coating layer 731 and the second coating layer 732 may include at least one of an anti-fingerprint layer (AF layer, anti-fouling layer or anti-fingerprint layer), a hard coating layer (HC layer), an anti-reflection layer (AR layer) (LR layer or low reflection layer) or an anti-glare layer (AG layer).

Referring to FIG. 5D, the electronic device 10 may further include a third coating layer 733 on the bottom of the first window 710 (e.g., a face toward the display 100 from the first window 710) in addition to the first coating layer 731 and the second coating layer 732 in FIGS. 5B and 5C. For example, the display 100 may be attached to the third coating layer 733, coated on the bottom of the first window 710, through the first adhesive 712.

For example, the third coating layer 733 may include at least one of an anti-fingerprint layer (AF layer, anti-fouling layer or anti-fingerprint layer), a hard coating layer (HC layer), an anti-reflection layer (AR layer) (LR layer or low reflection layer) or an anti-glare layer (AG layer).

According to various embodiments, the electronic device 10 may not include a coating layer on the bottom of the second window 720 (e.g., a face toward the first window 710 from the second window 720). For example, the second adhesive 722 that bonds the first window 710 and the second window 720 may have smaller adhesive strength than the first adhesive 712 that bonds the first window 710 and the display 100. For example, the bottom of the second window 720 may not include a coating layer in order for the second adhesive 722 to be not peeled off from the bottom of the second window 720 although the unfolding state and folding state of the electronic device 10 are repeated.

Figure 6:
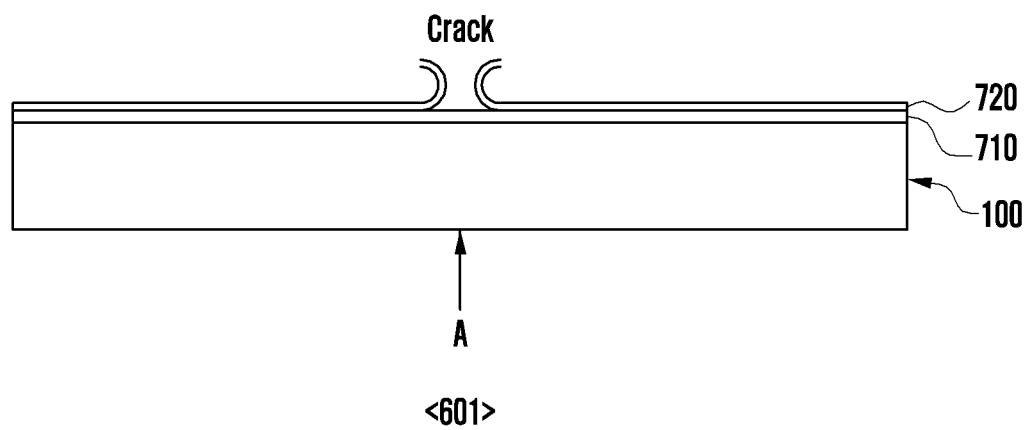
FIG. 6 is a diagram for describing damage to the display 100 of the electronic device 10 according to an embodiment of the disclosure.
Figure 6:
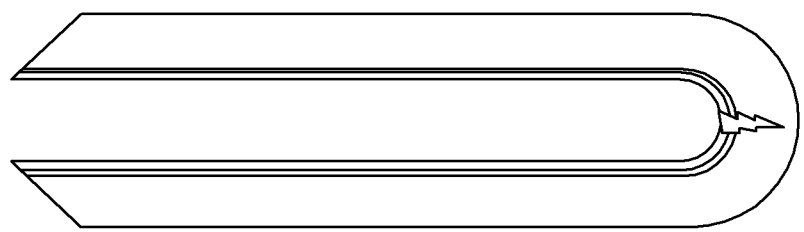
Figure 6:
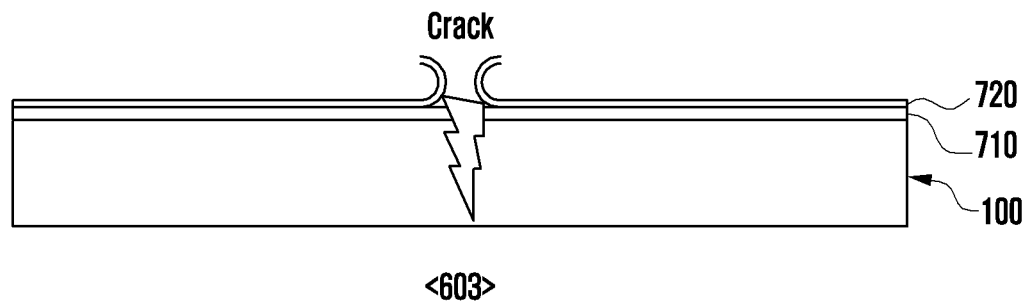

FIG. 6 is a diagram for describing damage to the display 100 of an electronic device (e.g., the electronic device 10 in FIG. 1) according to an embodiment of the disclosure.

Referring to FIG. 6, in <601>, according to various embodiments, an electronic device (e.g., the electronic device 10 in FIG. 1) may include a foldable electronic device which may be folded or unfolded with respect to one axis. For example, a folding operation and an unfolding operation may be repeatedly performed on an electronic device (e.g., the electronic device 10 in FIG. 1) with respect to a folding axis (axis A).

For example, an electronic device (e.g., the electronic device 10 in FIG. 1) may include the first window 710 disposed on the top of the display 100 and the second window 720 disposed on the top of the first window 710. For example, as a folding operation and an unfolding operation are repeatedly performed on an electronic device (e.g., the electronic device 10 in FIG. 1), a crack may occur on the second window 720 in a portion adjacent to the folding axis (axis A) of the electronic device (e.g., the electronic device 10 in FIG. 1).

As illustrated in <602> and <603>, although a crack has occurred in some areas of the second window 720, if a folding operation and an unfolding operation are repeatedly performed on an electronic device (e.g., the electronic device 10 in FIG. 1)), pressure by direct folding may be applied to an area under the second window 720 in which the crack has occurred (e.g., an area corresponding to the folding axis in each of the first window 710 and the display 100) without protection through the second window 720. For example, a crack may sequentially occur in the first window 710 and the display 100, and the first window 710 and the display 100 may be damaged.

In an electronic device (e.g., the electronic device 10 in FIG. 1) according to various embodiments of the disclosure, when a crack occurs in some areas of the second window 720, the first window 710 and the display 100 can be protected in a way to be not damaged by detaching the second window 720 from the first window 710 and attaching a new second window 720.

Figure 7A:
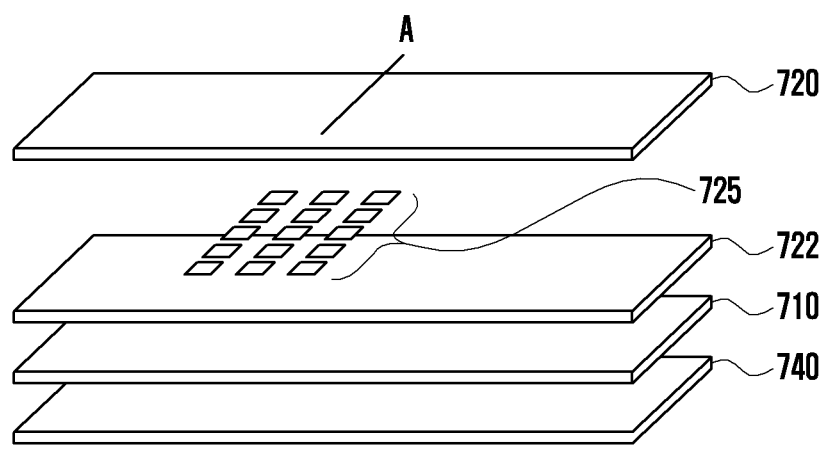
FIGS. 7A and 7B are diagrams for describing a method of detecting a crack in the second window 720 of the electronic device 10 according to various embodiments of the disclosure.
Figure 7A:
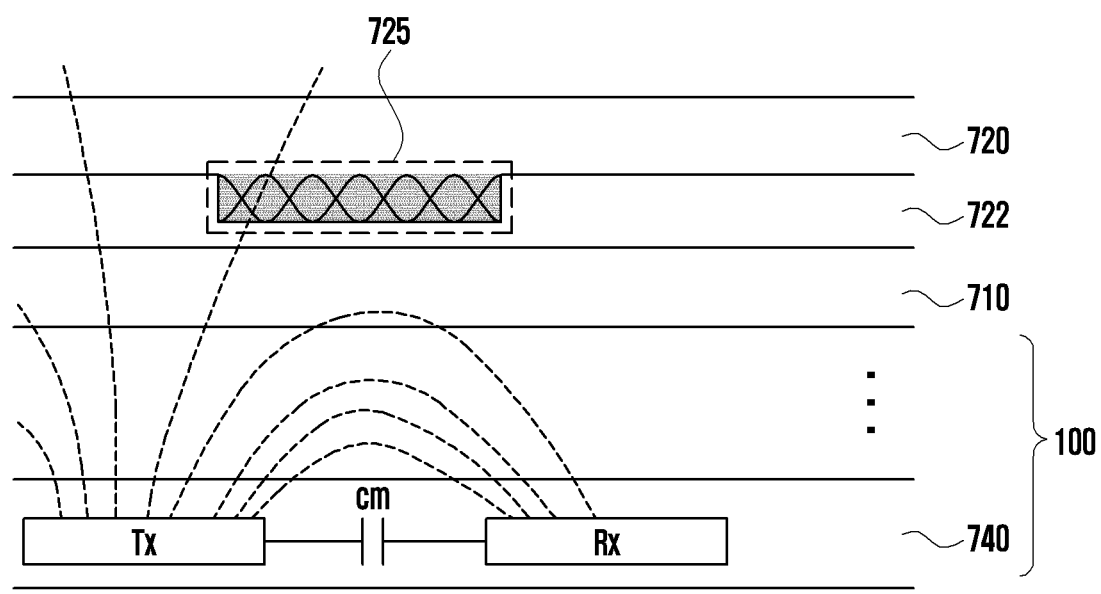
Figure 7B:
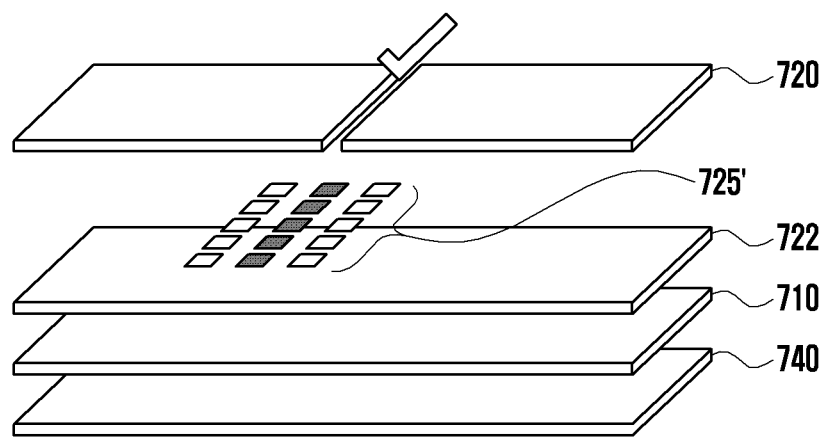
Figure 7B:
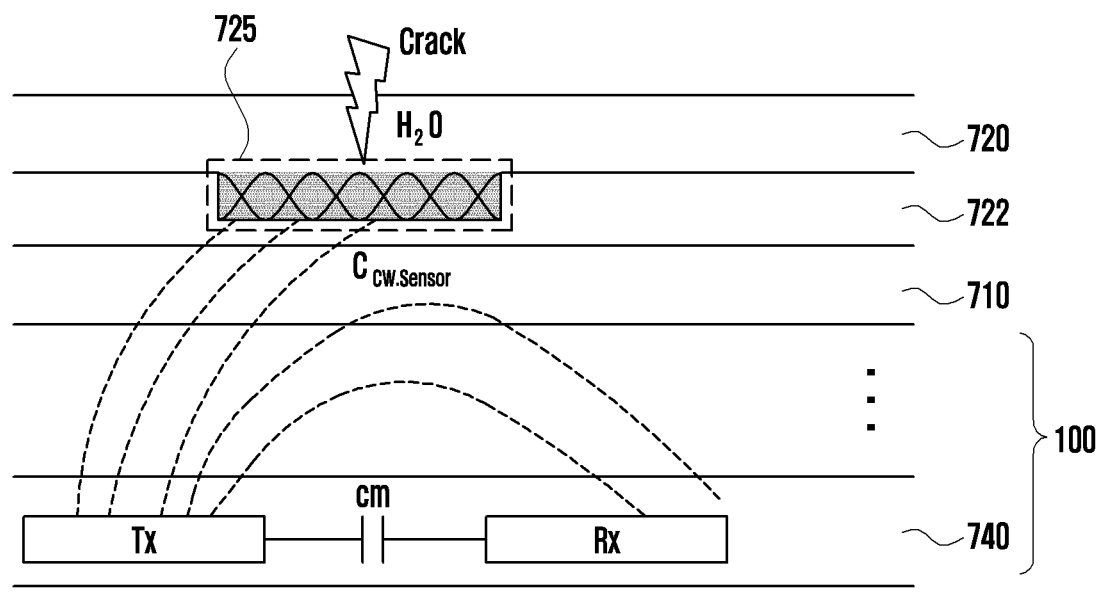

FIGS. 7A and 7B are diagrams for describing a method of detecting a crack in the second window 720 of an electronic device (e.g., the electronic device 10 in FIG. 1) according to various embodiments of the disclosure.

According to various embodiments, an electronic device (e.g., the electronic device 10 in FIG. 1) may include the first window 710 covering the top of the display 100 and the second window 720 covering the top of the first window 710. For example, the top of the first window 710 may be attached to the bottom of the second window 720 through the second adhesive 722.

According to various embodiments, the second window 720 may include a plurality of patterns 725 on the bottom thereof (e.g., a face toward the first window 710 from the second window 720). For example, the patterns 725 formed on the bottom of the second window 720 may be made of a hydrophile polymer material. For example, the patterns 725 may be made of at least one of poly methyl methacrylate (PMMA), poly vinyl alcohol (PVA), poly ethylene glycol (PEG), polyimide (PI), or cellulose. For example, if the patterns 725 are exposed to the air, a dielectric constant of the patterns 725 may be greatly increased compared to another area in which the pattern is not formed. For example, the patterns 725 may be formed to have a structure (e.g., a porous structure or a nano grass-like structure) having a wide surface area.

According to an embodiment, the second window 720 and the patterns 725 formed on the bottom of the second window 720 may be made of the same material (e.g., polyimide (PI)). For example, the patterns 725 may be formed by patterning some areas of the second window 720 in which the patterns 725 will be formed so that some areas have a greater surface area than another area. According to yet another embodiment, the second window 720 may not include separate patterns 725.

According to various embodiments, the plurality of patterns 725 may be formed in some areas of the second window 720 in which a crack is likely to occur. For example, the patterns 725 may be formed in a location adjacent to an area corresponding to the folding axis (axis A). For example, at least some of the patterns 725 may be formed in a location corresponding to an edge area of the second window 720.

According to yet another embodiment, the plurality of patterns 725 may be formed in the entire area of the second window 720. For example, the plurality of patterns 725 may be at least partially isolated at specific intervals and formed in the entire area of the second window 720.

According to various embodiments of the disclosure, the display 100 of an electronic device (e.g., the electronic device 10 in FIG. 1) may include a touch circuit 740. For example, the touch circuit 740 may include a touch sensor and a touch sensor IC for controlling the touch sensor. For example, the touch sensor IC may control the touch sensor in order to sense a touch input or a hovering input to a specific location of the display 100. For example, the touch circuit 740 may sense a touch input or a hovering input by measuring a change in a signal (e.g., a voltage, the quantity of light, resistance or the amount of charges) for a specific area of the display 100. The touch sensor IC may provide a processor or a display driving circuit with information (e.g., a location, an area, sensitivity, pressure or time) on the sensed touch input or hovering input. For example, the touch circuit 740 may be disposed between pixels of a pixel layer in which the pixels of the display 100 are disposed or on or below the pixel layer.

Referring to FIG. 7A, <701> is a diagram illustrating a structure in which the touch circuit 740 (e.g., the touch circuit 740 included in the display 100), the first window 710, and the second window 720 (e.g., the second window 720 in which a crack has not occurred) including the second adhesive 722 and the plurality of patterns 725 are stacked in an electronic device (e.g., the electronic device 10 in FIG. 1) according to an embodiment.

In <702>, a processor (e.g., an application processor (AP), a communication processor (CP), a sensor hub, a touch sensor IC, etc. of an electronic device (e.g., the electronic device 10 in FIG. 1)) of the electronic device 10 (e.g., the electronic device 10 in FIG. 1) may determine a signal value (e.g., a capacitance value) corresponding to the patterns 725 by using the touch circuit 740. For example, in <702>, the electronic device 10 may check that a signal value (e.g., a capacitance value) corresponding to the patterns 725 formed on the bottom of the second window 720 increases at a low speed based on an increase in the dielectric constant of the patterns 725, which increases at a low speed as time passes, when a crack does not occur in the second window 720.

According to various embodiments, an electronic device (e.g., the electronic device 10 in FIG. 1) may identify whether a crack has occurred in the second window 720 by comparing a signal value corresponding to the patterns 725 with a signal value corresponding to a reference pattern.

For example, the second window 720 may include the reference pattern in some areas (e.g., some portions of the non-display area of the display 100). For example, the reference pattern may have a high dielectric constant regardless of whether a crack occurs in the second window 720. For example, a signal value (e.g., a capacitance value) corresponding to the reference pattern may be measured to be greater than a signal value (e.g., a capacitance value) corresponding to the patterns 725 formed on the bottom of the second window 720 in which a crack has not occurred.

An electronic device (e.g., the electronic device 10 in FIG. 1) may obtain a reference signal value (e.g., a reference capacitance value) by using the reference pattern.

According to another embodiment, an electronic device (e.g., the electronic device 10 in FIG. 1) may previously store a reference signal value in a memory (e.g., a memory included in the touch circuit), and may identify whether the second window 720 has been damaged (e.g., a crack has occurred) by comparing a signal value corresponding to the patterns 725 of the second window 720 with the previously stored reference signal value.

Referring to FIG. 7B, <703> is a diagram illustrating a structure in which the touch circuit 740, the first window 710, and the second window 720 (e.g., the second window 720 in which a crack has occurred) including the second adhesive 722 and a plurality of patterns 725' are stacked in an electronic device (e.g., the electronic device 10 in FIG. 1) according to an embodiment.

Referring to FIG. 7B, at <704>, if a crack has occurred in the second window 720, the electronic device 10 may check that a signal value (e.g., a capacitance value) corresponding to the patterns 725' disposed in an area where a crack has occurred has increased at a rapid speed compared to the signal value corresponding to the patterns 725 that increases at a low speed as time passes in FIG. 7A.

For example, the electronic device 10 may obtain a signal value (e.g., a reference signal value) corresponding to the reference pattern formed in some areas of the second window 720 by using the touch circuit 740. For example, if a crack has occurred in the second window 720, a signal value corresponding to the patterns 725' disposed in an area where the crack has occurred may be the same as a reference signal value corresponding to the reference pattern within an error range.

According to various embodiments, the electronic device 10 may obtain signal values (e.g., capacitance values) by using the touch circuit 740 with respect to patterns and a reference pattern(s) formed on the bottom of the second window 720, and may identify whether a crack has occurred in the second window 720 or at which location of the second window 720 a crack has occurred based on a result of a comparison between the obtained values.

For example, when a designated event condition is satisfied, the electronic device 10 (e.g., the processor of the electronic device 10) may obtain a signal value corresponding to the plurality of patterns 725 by using the touch circuit 740.

For example, when the electronic device 10 is powered on, when a state of the electronic device 10 changes from the folding state to the unfolding state, when a state of the electronic device 10 changes from a sleep state to a wake-up state, or if a touch input is not applied for a preset time, the electronic device 10 may determine that a designated event condition is satisfied and obtain a signal value for the plurality of patterns 725.

For example, when a signal value for the plurality of patterns 725 is obtained, if a touch input is applied from the outside or water ($H_2O$) is present on the top of the second window 720, it may be difficult to obtain an accurate signal value for the patterns 725 due to an external factor. For example, when obtaining a signal value for the patterns 725, the electronic device 10 may generate user notification and output the user notification through the display 100 so that a touch input is not applied (or a signal value is obtained in the state in which water is not present in the electronic device 10). According to another embodiment, the user notification may be output in a step prior to an operation of obtaining a signal value again, if a signal value for the plurality of patterns 725 is obtained and it is determined that a crack has occurred in the second window 720 based on the obtained signal value.

According to various embodiments, the electronic device 10 may output a notification screen related to the replacement of the second window 720 through the display 100 based on a result of a determination of whether a crack has occurred in the second window 720. For example, if the second window 720 has been damaged, the electronic device 10 may increase the period in which the electronic device 10 can be used through the replacement of the second window 720 before direct damage to the first window 710 or the display 100 occurs by providing replacement notification to a user.

Referring to FIGS. 7A and 7B, at <702> and <704>, the electronic device 10 has been illustrated as if it obtains a capacitance value in a mutual-capacitance manner by using the touch circuit 740, but the disclosure is not limited thereto. The electronic device 10 may obtain a signal value (e.g., a capacitance value) for the patterns 725 by using various methods including a self-capacitance method.

According to various embodiment of the disclosure, a construction in which one window that belongs to the two windows and that is disposed at a location distant from the display is easily peeled off has been illustrated and described, but the disclosure is not limited thereto. For example, in other embodiments of the disclosure, it is evident that three or more windows may be stacked on the display and may have a construction in which at least one of the remaining windows except a window facing the display is easily peeled off through technologies proposed in various embodiments of the disclosure for maintenance purposes.

A foldable electronic device (e.g., the electronic device 10 in FIG. 1) according to the various embodiments may include a flexible display (e.g., the flexible display 100 in FIG. 1), a first window (e.g., the first window 710 in FIG. 5A) including a first face toward the flexible display and a second face toward a direction opposite to the first face and having the first face attached to at least some areas of the flexible display through a first adhesive (e.g., the first adhesive 712 in FIG. 5A), and a second window (e.g., the second window 720 in FIG. 5A) attached to at least some areas of the second face of the first window through a second adhesive (e.g., the second adhesive 722 in FIG. 5A) having smaller adhesive strength than the first adhesive.

For example, the second window may have a plurality of patterns (e.g., the patterns 725 in FIG. 7A) formed in at least some areas of one face toward the first window.

For example, the plurality of patterns is made of a hydrophile polymer material, and may have a dielectric constant varying based on whether the patterns are exposed to the air.

For example, at least some of the patterns may be disposed in at least part of an area corresponding to the folding axis of the flexible display or an edge area of the flexible display.

A foldable electronic device (e.g., the electronic device 10 in FIG. 1 or the electronic device 801 in FIG. 8) according to various embodiments further includes a processor (e.g., the processor 820 in FIG. 8) and a memory (e.g., the memory 830 in FIG. 8) coupled to the processor operatively. The memory may include instructions that enable the processor, upon execution, to determine a capacitance value corresponding to the plurality of patterns by using a touch circuit (e.g., the touch circuit 740 in FIG. 7A) included in the flexible display and to identify whether the second window has been damaged based on the capacitance value.

For example, the plurality of patterns includes a reference pattern. The instructions may include instructions that enable the processor to compare a reference capacitance value corresponding to the reference pattern and a capacitance value corresponding to patterns except the reference pattern and to identify that the second window has been damaged when the capacitance value corresponds to the reference capacitance value.

For example, the instructions may include instructions that enable the processor to output a notification screen related to the replacement of the second window through the flexible display based on the identification of the damaged second window.

For example, the flexible display includes a display area (e.g., the display area 104 in FIG. 4B) including a plurality of pixels and a non-display area (e.g., the non-display area 105 in FIG. 4B), that is, an area other than the display area. The second window may be disposed in the display area of the flexible display, and an area corresponding to at least some portions of the non-display area.

For example, the foldable electronic device may further include a bezel covering at least part of the edge area of the second window.

For example, the first window and the second window may be made of a polymer material.

A foldable electronic device (e.g., the electronic device 10 in FIG. 4A) according to various embodiments may include a hinge structure (e.g., the hinge structure 536 in FIG. 4A), a first housing structure (e.g., the first housing structure 510 in FIG. 4A) connected to the hinge structure and configured to include a first face (e.g., the first face 501 in FIG. 4A), a second face (e.g., the second face 502 in FIG. 4A) toward a direction opposite to the first face, and a first side housing (e.g., the first side member 532 in FIG. 4A) surrounding at least part of a first space between the first face and the second face, a second housing structure (e.g., the second housing structure 520 in FIG. 4A) connected to the hinge structure, configured to include a third face (e.g., the third face 503 in FIG. 4A), a fourth face (e.g., the fourth face 504 in FIG. 4A) directed toward a direction opposite to the third face, and a second side housing (e.g., the second side member 542 in FIG. 4A) surrounding at least part of a second space between the third face and the fourth face, and folded along with the first housing structure by using the hinge structure as an axis, a flexible display (e.g., the display 100 in FIG. 4A) disposed in the first space of the first housing structure and the second space of the second housing structure and configured to have at least some portions thereof viewed through a first direction toward the first face and the third face, a first window (e.g., the first window 710 in FIG. 5A) attached to at least some areas of one face toward the first direction of the flexible display through a first adhesive (e.g., the first adhesive 712 in FIG. 5A), and a second window (e.g., the second window 720 in FIG. 5A) attached to at least some areas of one face toward the first direction of the first window through a second adhesive (e.g., the second adhesive 722 in FIG. 5A).

For example, the second adhesive may have smaller adhesive strength than the first adhesive. A thickness of a portion on which the second adhesive has been coated may be smaller than a thickness of a portion on which the first adhesive has been coated.

For example, the second window may have a plurality of patterns formed in at least some portions of the other face toward a second direction, that is, a direction opposite to the first direction.

For example, the plurality of patterns may be made of a hydrophile polymer material, and may have a dielectric constant much higher than a preset value based on a contact with the air.

According to various embodiments, a foldable electronic device (e.g., the electronic device 10 in FIG. 1 or the electronic device 801 in FIG. 8) further includes a touch circuit (e.g., the touch circuit 740 in FIG. 7A), a processor (e.g., the processor 820 in FIG. 8), and a memory (e.g., the memory 830 in FIG. 8) coupled to the processor operatively. The memory may store instructions that enable the processor, upon execution, to determine a capacitance value for areas in which the plurality of patterns is formed by using the touch circuit and to identify whether the second window has been damaged based on the determined capacitance value.

For example, the instructions may include instructions that enable the processor to output a notification screen related to the replacement of the second window through the flexible display based on the identification of whether the second window has been damaged.

For example, the first face and the third face may be disposed to cover at least some areas of the second window.

For example, the first window and the second window may be made of a polymer material.

A method of detecting a crack in a window of an electronic device according to various embodiments may include an operation of determining, by the processor, a capacitance value for a plurality of patterns formed on the bottom of a window covering a display by using a touch circuit; and an operation of identifying, by the processor, whether the window has been damaged based on the determined capacitance value.

For example, the method may further include an operation of outputting a notification screen related to the replacement of the window through the display based on a result of the identification of whether the window has been damaged.

Figure 8:
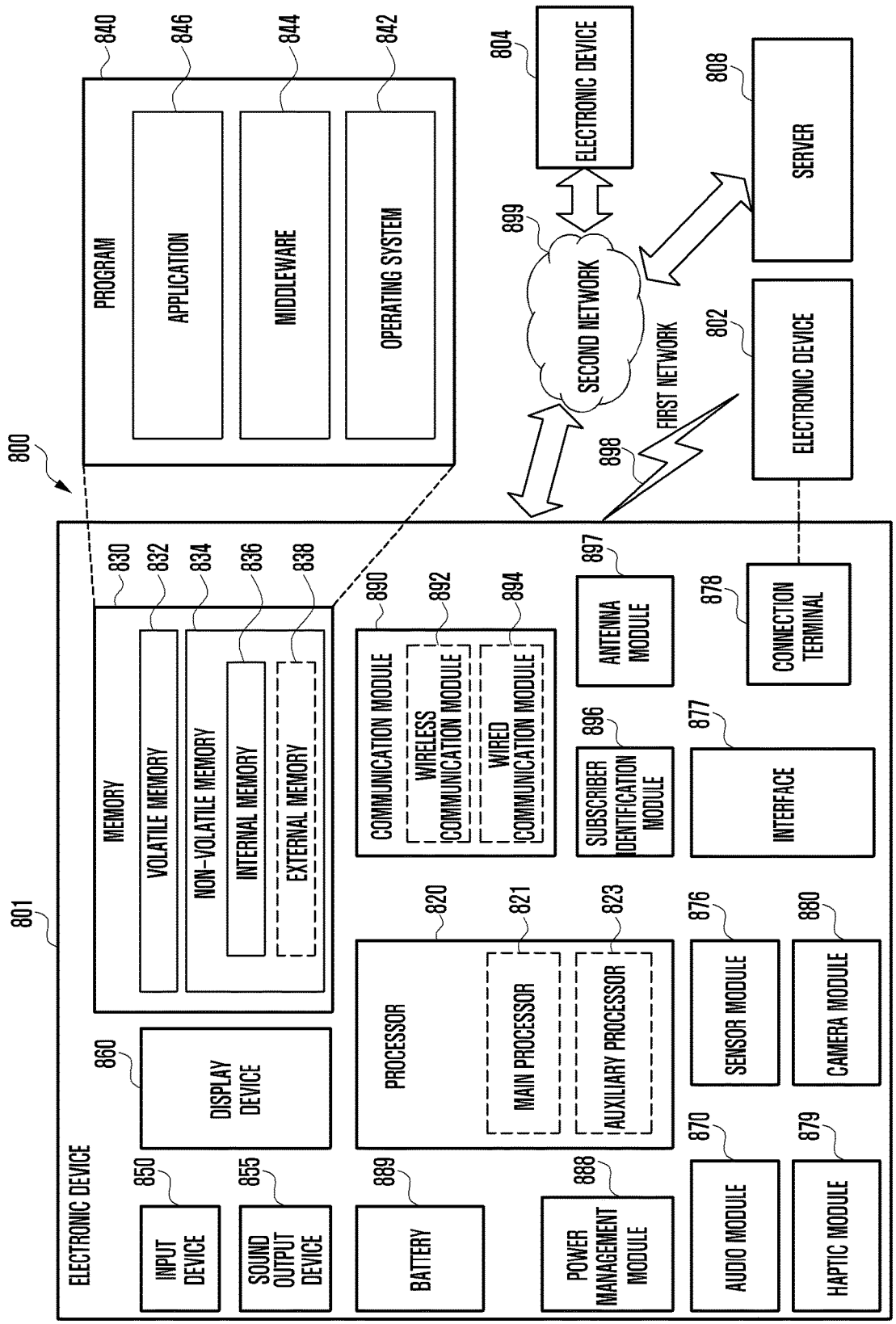
FIG. 8 is a block diagram of an electronic device 801 (e.g., the electronic device 10 of FIG. 1 or 3) within a network environment 800 according to an embodiment of the disclosure.

FIG. 8 is a block diagram illustrating an electronic device 801 (e.g., the electronic device 10 described in FIG. 1 or FIG. 3) in a network environment 800 according to an embodiment of the disclosure.

Referring to FIG. 8, the electronic device 801 in the network environment 800 may communicate with an electronic device 802 via a first network 898 (e.g., a short-range wireless communication network), or an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) 896, or an antenna module 897. In some embodiments, at least one (e.g., the display device 860 or the camera module 880) of the components may be omitted from the electronic device 801, or one or more other components may be added in the electronic device 801. In some embodiments, some of the components may be implemented as single integrated circuitry. For example, the sensor module 876 (e.g., a fingerprint sensor, an iris sensor, or an illuminance sensor) may be implemented as embedded in the display device 860 (e.g., a display).

The processor 820 may execute, for example, software (e.g., a program 840) to control at least one other component (e.g., a hardware or software component) of the electronic device 801 coupled with the processor 820, and may perform various data processing or computation. According to one embodiment, as at least part of the data processing or computation, the processor 820 may load a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input device 850 may receive a command or data to be used by another component (e.g., the processor 820) of the electronic device 801, from the outside (e.g., a user) of the electronic device 801. The input device 850 may include, for example, a microphone, a mouse, a keyboard, or a digital pen (e.g., a stylus pen).

The sound output device 855 may output sound signals to the outside of the electronic device 801. The sound output device 855 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. According to an embodiment, the display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. According to an embodiment, the audio module 870 may obtain the sound via the input device 850, or output the sound via the sound output device 855 or a headphone of an external electronic device (e.g., an electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to an embodiment, the connecting terminal 878 may include, for example, a HDMI connector, a USB connector, a SD card connector, or an audio connector (e.g., a headphone connector).

The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or infrared data association (IrDA)) or the second network 899 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. According to an embodiment, the antenna module 897 may include an antenna including a radiating element composed of a conductive material or a conductive pattern formed in or on a substrate (e.g., PCB). According to an embodiment, the antenna module 897 may include a plurality of antennas. In such a case, at least one antenna appropriate for a communication scheme used in the communication network, such as the first network 898 or the second network 899, may be selected, for example, by the communication module 890 (e.g., the wireless communication module 892) from the plurality of antennas. The signal or the power may then be transmitted or received between the communication module 890 and the external electronic device via the selected at least one antenna. According to an embodiment, another component (e.g., a radio frequency integrated circuit (RFIC)) other than the radiating element may be additionally formed as part of the antenna module 897.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the electronic devices 802 and 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A portable communication device comprising:
    a flexible display;
    a housing accommodating the flexible display, the housing including a side portion and a top portion protruded from the side portion;
    a first transparent member disposed over the flexible display and foldable according to the flexible display being folded;
    a first adhesive layer disposed between the flexible display and the first transparent member, the first adhesive layer having a first thickness;
    a second transparent member disposed over the first transparent member and foldable according to the flexible display being folded; and
    a second adhesive layer disposed between the first transparent member and the second transparent member, the second adhesive layer having a second thickness smaller than the first thickness, wherein the flexible display is visible through the first transparent member, the first adhesive layer, the second transparent member, and the second adhesive layer wherein, when viewed in a direction substantially perpendicular to the flexible display, a first edge portion of the first transparent member is overlapped with and spaced apart from the top portion of the housing, and a second edge portion of the second transparent member is overlapped with and spaced apart from the top portion, and wherein the first edge portion is spaced apart from the side portion by a first distance, and the second edge portion is spaced apart from the side portion by a second distance which is different from the first distance.

2. The portable communication device of claim 1, wherein the first adhesive layer has a first adhesive strength, and the second adhesive layer has a second adhesive strength lower than the first adhesive strength.

3. The portable communication device of claim 2, wherein the second adhesive layer is configured such that, when an external force is applied, the second transparent member is detachable from the first transparent member while the first transparent member remains as attached to the flexible display via the first adhesive layer.

4. The portable communication device of claim 1, wherein the first edge portion is spaced apart from the side portion by a first distance, and the second edge portion is spaced apart from the side portion by a second distance greater than the first distance.

5. The portable communication device of claim 1, further comprising an opaque member disposed on the first edge portion such that the opaque member is overlapped with the top portion when viewed in the direction.

6. The portable communication device of claim 1, further comprising a coating layer disposed on the second transparent member and forming a portion of an external surface of the portable communication device.

7. The portable communication device of claim 6, wherein the coating layer includes at least one of an anti-fingerprint layer, a hard coating layer, an anti-reflection layer, or an anti-glare layer.

8. The portable communication device of claim 1, further comprising a coating layer disposed on a surface of the first transparent member facing the second transparent member.

9. The portable communication device of claim 8, wherein the coating layer includes at least one of an anti-fingerprint layer, a hard coating layer, an anti-reflection layer, or an anti-glare layer.

10. The portable communication device of claim 1, wherein the first transparent member includes a poly imide (PI) layer.

11. The portable communication device of claim 1, wherein the second transparent member includes a polyethylene terephthalate (PET) layer.

12. The portable communication device of claim 1, wherein the first transparent member includes a plurality of polymer layers and the second transparent member includes a single polymer layer.

13. The portable communication device of claim 1, further comprising a sensor accommodated in the housing such that the sensor is not overlapped with the first transparent member or the second transparent member.

14. The portable communication device of claim 1, wherein the first transparent member and the second transparent member are configured such that each of the first edge portion and the second edge portion remains as at least partially overlapped with the top portion, when a folding state of the flexible display is changed from an unfolded state to a folded state.

* * * * *